(12) United States Patent
Takahashi et al.

(10) Patent No.: US 7,567,078 B2
(45) Date of Patent: Jul. 28, 2009

(54) MAGNETIC ROTATION-ANGLE SENSOR AND ANGLE-INFORMATION PROCESSING DEVICE

(75) Inventors: Kenichi Takahashi, Tokyo (JP); Masahiro Nakamura, Tokyo (JP)

(73) Assignee: Asahi Kasei Emd Corporation, Tokyo (JP)

( * ) Notice: Subject to any disclaimer, the term of this patent is extended or adjusted under 35 U.S.C. 154(b) by 90 days.

(21) Appl. No.: 11/794,327

(22) PCT Filed: Dec. 27, 2005

(86) PCT No.: PCT/JP2005/023948

§ 371 (c)(1),
(2), (4) Date: Jun. 28, 2007

(87) PCT Pub. No.: WO2006/070826

PCT Pub. Date: Jul. 6, 2006

(65) Prior Publication Data

US 2008/0048654 A1    Feb. 28, 2008

(30) Foreign Application Priority Data

Dec. 28, 2004  (JP) .............................. 2004-381717

(51) Int. Cl.
*G01B 7/30* (2006.01)
(52) U.S. Cl. ............................................... 324/207.25
(58) Field of Classification Search ............ 324/207.25, 324/251, 207.2, 207.21, 207.12, 207.22, 324/166, 173, 174, 260; 338/32 R, 32 H; 318/254, 727, 809, 810
See application file for complete search history.

(56) References Cited

U.S. PATENT DOCUMENTS

| | | | |
|---|---|---|---|
| 4,908,685 A | 3/1990 | Shibasaki et al. | |
| 5,453,727 A | 9/1995 | Shibasaki et al. | |
| 5,880,586 A * | 3/1999 | Dukart et al. | 324/207.2 |
| 6,610,583 B2 | 8/2003 | Ueda et al. | |

(Continued)

FOREIGN PATENT DOCUMENTS

CN        13330391        1/2002

(Continued)

OTHER PUBLICATIONS

Office Action (and Notice) dated Aug. 3, 2007 in the corresponding Chinese Patent Application No. 2004800053997.

(Continued)

*Primary Examiner*—Reena Aurora
(74) *Attorney, Agent, or Firm*—Finnegan, Henderson, Farabow, Garrett & Dunner, LLP

(57) ABSTRACT

A simple circuit configuration without increasing the number of magnetic poles of a magnet can be performed and angular resolution can be improved. The polarities is determined and the absolute values are compared in accordance with the rotation angle of a magnet (1) based on sensor output signals a and b outputted from the magnetic sensors (2) and (3) to produce polarity determination signals c and d and absolute-value-comparison signals e, f, and g. The rotation angle of the magnet (1) is determined based on the polarity determination signals c and d and the absolute-value-comparison signals e, f, and g to output a determination result signal h.

7 Claims, 22 Drawing Sheets

U.S. PATENT DOCUMENTS 7,193,288 B2     3/2007     Fukunaka et al.

FOREIGN PATENT DOCUMENTS

| | | |
|---|---|---|
| JP | 51-045234 | 12/1976 |
| JP | 01-13211 B2 | 10/1982 |
| JP | 01-15135 B2 | 11/1982 |
| JP | 02-47849 B2 | 5/1983 |
| JP | 03-59571 | 1/1984 |
| JP | 60-037183 A | 2/1985 |
| JP | 07-13987 B2 | 12/1986 |
| JP | 01-100443 | 7/1989 |
| JP | 02-033585 | 3/1990 |
| JP | 07-249577 A | 9/1995 |
| JP | 10-233539 A | 9/1998 |
| JP | 11-233849 A | 8/1999 |
| JP | 11-251657 A | 9/1999 |
| JP | 2000-101162 A | 4/2000 |
| JP | 2000-150983 A | 5/2000 |
| JP | 2002-107382 A | 4/2002 |
| JP | 2002-289973 A | 10/2002 |
| JP | 2002-299599 A | 10/2002 |

OTHER PUBLICATIONS

Y. Shiromizu, "Angle Detector and Pointing Device", Patent Abstracts of Japan, JP 9-6527, Jan. 10, 1997.

Y. Inagaki et al., "Steering Angle Detecting Device for Car", Patent Abstracts for Japan, JP 2000-46536, Feb. 18, 2000.

H. Kato et al., "Rotation Angle Detecting Device", Patent Abstracts for Japan, JP 2001-114116, Apr. 24, 2001.

K. Matsuzaki et al., "Rotation Angle Detector and Its Apparatus", Patent Abstracts for Japan, JP 2002-243407, Aug. 28, 2002.

S. Nitta et al., "Rotation Angle Detecting Apparatus", Patent Abstracts for Japan, JP 2004-239672, Aug. 26, 2004.

A. Yashiro, "Encoder Interpolating Circuit", Patent Abstracts for Japan, JP 1-163615, Jun. 27, 1989.

Y. Yoshida et al., "Encoder Device and signal Processing Method Thereof", Patent Abstracts of Japan, JP 2001-264109, Sep. 26, 2001.

Y. Morimoto, "Position Detector, Lens Equipped With This, and Method For Position Detection", Patent Abstracts of Japan, JP 2004-61459, Feb. 26, 2004.

T. Akita, "Position and Speed Detecting System", Patent Abstracts of Japan, JP 55-76905, Jun. 10, 1980.

Y. Takekoshi et al., "Absolute Position Encoder", Patent Abstracts of Japan, JP 63-311119, Dec. 19, 1988.

H. Kawasaki, "Position Detecting Device", Patent Abstracts of Japan, JP 6-307889, Nov. 4, 1994.

"National Technical Report" and English Language Translation, (1996), vol. 42, No. 4, pp. 84-92.

\* cited by examiner

150

| ROTATION POSITION | CODE |
|---|---|
| 0 ~ 45°     (1) | 000 |
| 45°~ 90°    (2) | 001 |
| 90°~ 135°   (3) | 010 |
| 135°~ 180°  (4) | 011 |
| 180°~ 225°  (5) | 100 |
| 225°~ 270°  (6) | 101 |
| 270°~ 315°  (7) | 110 |
| 315°~ 360°  (8) | 111 |

FIG.4

16-DIVISION ROTATION-ANGLE SENSOR

| ANGLE | c | d | j | l | g | m | D3 | D2 | D1 | D0 |
|---|---|---|---|---|---|---|---|---|---|---|
| (1) | 0 | 0 | 0 | 1 | 0 | 0 | 0 | 0 | 0 | 0 |
| (2) | 0 | 0 | 0 | 0 | 0 | 1 | 0 | 0 | 0 | 1 |
| (3) | 0 | 0 | 0 | 0 | 1 | 1 | 0 | 0 | 1 | 0 |
| (4) | 0 | 1 | 0 | 1 | 1 | 0 | 0 | 1 | 1 | 1 |
| (5) | 0 | 1 | 1 | 1 | 1 | 0 | 0 | 0 | 1 | 0 |
| (6) | 0 | 1 | 1 | 1 | 0 | 0 | 0 | 1 | 1 | 1 |
| (7) | 1 | 1 | 1 | 0 | 0 | 0 | 1 | 1 | 0 | 0 |
| (8) | 1 | 1 | 1 | 0 | 0 | 1 | 1 | 0 | 0 | 1 |
| (9) | 1 | 1 | 1 | 0 | 1 | 1 | 1 | 0 | 1 | 0 |
| (10) | 1 | 0 | 1 | 1 | 1 | 1 | 1 | 1 | 1 | 1 |
| (11) | 1 | 0 | 0 | 1 | 1 | 1 | 1 | 0 | 1 | 0 |
| (12) | 1 | 0 | 0 | 1 | 0 | 1 | 1 | 1 | 1 | 1 |
| (13) | 1 | 0 | 0 | 1 | 0 | 0 | 1 | 1 | 0 | 0 |
| (14) | 1 | 0 | 0 | 0 | 0 | 0 | 1 | 1 | 0 | 1 |
| (15) | 1 | 0 | 0 | 0 | 1 | 0 | 1 | 1 | 1 | 0 |
| (16) | 1 | 0 | 0 | 1 | 0 | 0 | 1 | 1 | 1 | 1 |

MAGNETIC ROTATION-ANGLE SENSOR AND ANGLE-INFORMATION PROCESSING DEVICE

TECHNICAL FIELD

The present invention relates to a magnetic rotation-angle sensor and an angle-information processing device.

BACKGROUND ART

Conventional rotation-angle sensors include a rotation-angle sensor utilizing a non-contact magnetic method, a rotation-angle sensor utilizing a contact-type mechanical method, and the like.

FIG. 21 is an example of a non-contact rotation-angle sensor as a first conventional example.

Two magnetic sensors 2 and 3 are arranged around a rotatable magnet 1. Output signals a and b whose amplitudes are different from each other are detected through the magnetic sensors 2 and 3 based on the rotation angle of the magnet 1. The detected output signals a and b are amplified by an amplifier 200 and the polarities of the output signals a and b are determined by polarity determination circuits 201 and 202. Then, digital output signals D1 and D2 are created based on the result of polarity-determination and the result of determination by an angle determination circuit 203, and the rotation angle of the magnet 1 can be calculated.

FIGS. 22A and 22B are each an example of a contact-type rotation-angle sensor as a second conventional example.

FIG. 22A is a schematic configuration of a potentiometer 250 used for a switch of a camera as a contact-type rotation-angle sensor. A switch main body 252 is contained only in a camera case 253 without a rotation dial portion 251.

FIG. 22B is a circuit configuration including a variable resistor 254 in the switch main body 252.

The electric potential of a contact portion 255 between the variable resistor 254 over terminals V1 and V2 and a mechanical rotation axle is detected as an analogue output signal. Thus, the rotation angle of a mechanical switch is calculated.

Patent Document 1: Japanese Patent Laid-Open No. 9-6527
Patent Document 2: Japanese Patent Laid-Open No. 2000-46536
Patent Document 3: Japanese Patent Laid-Open No. 2001-114116
Patent Document 4: Japanese Patent Laid-Open No. 2002-243407
Patent Document 5: Japanese Patent Laid-Open No. 2004-239672

DISCLOSURE OF THE INVENTION

In a non-contact rotation-angle sensor as shown in the first conventional example, there is a problem that the angular resolution in the rotation angle of the magnet is low.

As an example, assuming that the number of paired magnetic poles is N, when the magnet is rotated by 360° and the number N=2, the angular resolution is only four.

However, raising the angular resolution increases the number of magnetic poles. There is a problem that the circuit configuration for performing signal processing is complicated and the cost increases.

Further, it is a problem that the absolute angle cannot be determined in the case that the number of magnetic poles is increased to raise the angular resolution.

Furthermore, in addition to angular resolution, it is required to suppress variations in the intensity of the magnet and in the sensitivity of the magnetic sensor. There is a problem that more complicated control and circuit configuration are required in the case that variations are limited within predetermined values.

Furthermore, in order to raise the angular resolution, it is required to accurately maintain positional relationship between the magnet and the magnetic sensors. Thus, more strict assembly accuracy is required, thereby causing inefficiency in production.

In a contact-type rotation-angle sensor as shown in the second conventional example, the knob 251 as a rotation portion is separated from the switch main body 252. Thus, there is a problem that the configuration of the switch is enlarged as a whole because the knob 251 is not integrally contained in the camera case 253. Further, there is a problem that it is difficult to make a water-proof and dust-proof structure because a structure that the axes penetrate the camera case 253 is made.

An object of the present invention is to provide a magnetic rotation-angle sensor and an angle-information processing device that a simple circuit configuration can be obtained without increasing the number of magnetic poles and angular resolution can be improved.

Moreover, Another object of the present invention is to provide a magnetic rotation-angle sensor and an angle-information processing device that angle information can be obtained in stable state, even though the variation in the accuracy of the assembly positions between the magnet and the magnetic sensors, and the variation in the sensitivity of the sensors are generated.

Furthermore, Another object of the present invention is to provide a magnetic rotation-angle sensor and an angle-information processing device that the switch configuration can be made for compactness and light weight, thereby making a low cost switching configuration.

According to the present invention, a magnetic rotation-angle sensor comprising: a magnetic-pole generation means for generating one or more pairs of N-polarity and S-polarity magnetic poles; a plurality of magnetic sensors, arranged around the magnetic-pole generation means, with a predetermined angle to the rotation center of the magnetic-pole generation means; a plurality of polarity determination means for determining the polarities of sensor output signals outputted from the magnetic sensors and outputting polarity determination signals indicating the determined polarities; a plurality of absolute-value generation means for generating absolute values corresponding to the sensor output signals outputted from the magnetic sensors; a plurality of comparison-result output means for comparing the generated absolute values and outputting absolute value comparison signals indicating results of the comparison; and an angle determination means for determining rotation angle of the magnetic-pole generation means, based on the polarity determination signals and the absolute value comparison signals, and outputting a predetermined determination result signal.

According to the present invention, the determination result signal has angular resolution of $2^{(N+1)}$ per pair of magnetic poles when the magnetic-pole generation means is rotated by 360° when the number of the magnetic sensors is N.

According to the present invention, the plurality of magnetic sensors is configured as at least one pair of sensors, by arranging a pair of the magnetic sensors on a diagonal line that passes through the rotation center of the magnetic-pole generation means, wherein the magnetic sensors use the difference between the outputs from the sensors in the one pair as the sensor output signal, and perform the polarity determination and the absolute-value comparison based on the respective sensor output signals outputted from at least two pairs of sensors.

According to the present invention, the magnetic rotation-angle sensor further comprising: an addition means for adding at least two sensor output signals outputted from the magnetic sensors and producing a third sensor output signal, wherein the third sensor output signal is inputted to at least one each of the polarity determination means and the absolute-value generation means to output polarity determination signals and absolute value comparison signals that correspond to the third sensor output signal, and the angle determination means determines rotation angle of the magnetic-pole generation means based on the polarity determination signals and the absolute-value-comparison signals to output a predetermined determination result signal.

According to the present invention, the respective sensor output signals outputted from the magnetic sensors is sinusoidal waves.

According to the present invention, the addition means have gain of $1/\sqrt{2}$.

According to the present invention, the magnetic sensors are arranged such that, as the sensor output signals, a signal in proportion to sin A outputted from a first magnetic sensor and a signal in proportion to sin B outputted from a second magnetic sensor are produced when the magnetic-field generation means is rotated in the case that the number N of magnetic sensors is two, wherein the magnetic sensors have the resolution of $2^M$ (M is an arbitrary integer that is the same as or larger than four) per pair of magnetic poles when the magnetic-field generation means is rotated by 360°.

According to the present invention, an angle-information processing device comprising: the magnetic rotation-angle sensor; a rotation portion with which the magnetic-field generation means of the magnetic rotation-angle sensor is provided; and a signal processing portion, which is a circuit configuration portion excluding the magnetic-field generation means of the magnetic rotation-angle sensor, wherein the signal processing portion performs a predetermined digital-signal processing to sensor output signals outputted from the plurality of magnetic sensors arranged around the rotation portion with a predetermined angle and outputs a determination result signal.

According to the present invention, the signal processing portion further comprising: a signal conversion processing portion for converting the digitized processed determination result signal into an analogue signal.

According to the present invention, determining the polarities of sensor output signals outputted from the magnetic sensors and comparing the absolute values to provide polarity determination signals and absolute value comparison signals, and determining the rotation angle of the magnetic-pole generation means based on the produced polarity determination signals and the absolute value comparison signals to output a determination result signal. Therefore, the number of magnetic poles for obtaining the same angular resolution as a conventional magnetic rotation-angle sensor can be halved. Further, in the case where the number of magnetic poles is the same, the angular resolution can be set to double resolution. Furthermore, in the case where a magnet has a pair of poles and the number of magnetic sensors is N, an absolute angle $2^{(N+1)}$ can be obtained by dividing an angle of 360°. As a result, a simple circuit configuration can be obtained without increasing the number of magnetic poles of the magnet and angular resolution can be improved.

According to the present invention, the addition means has a function that the angular resolution can be improved without increasing the number of sensors.

According to the present invention, angle information can be obtained under stable state, regardless of the variations in the intensity of the magnet or the sensitivity of the magnetic sensors.

According to the present invention, the positional relationship between the magnet and the magnetic sensors can relatively freely be set, whereby obtaining flexibility regarding design of the size and the layout.

BRIEF DESCRIPTION OF THE DRAWINGS

FIG. 4 is an explanatory table showing the relationship between the rotation angle of a magnet and a digital determination result signal;

FIG. 10 is a schematic view showing the relationship between the rotation angle of a magnet and a digital determination result signal;

BEST MODE FOR CARRYING OUT THE INVENTION

The present invention will be described in detail below with reference to drawings.

Embodiment 1

A first embodiment of the present invention will be described with reference to FIGS. 1 to 6.

<Circuit Configuration>

Figure 1:
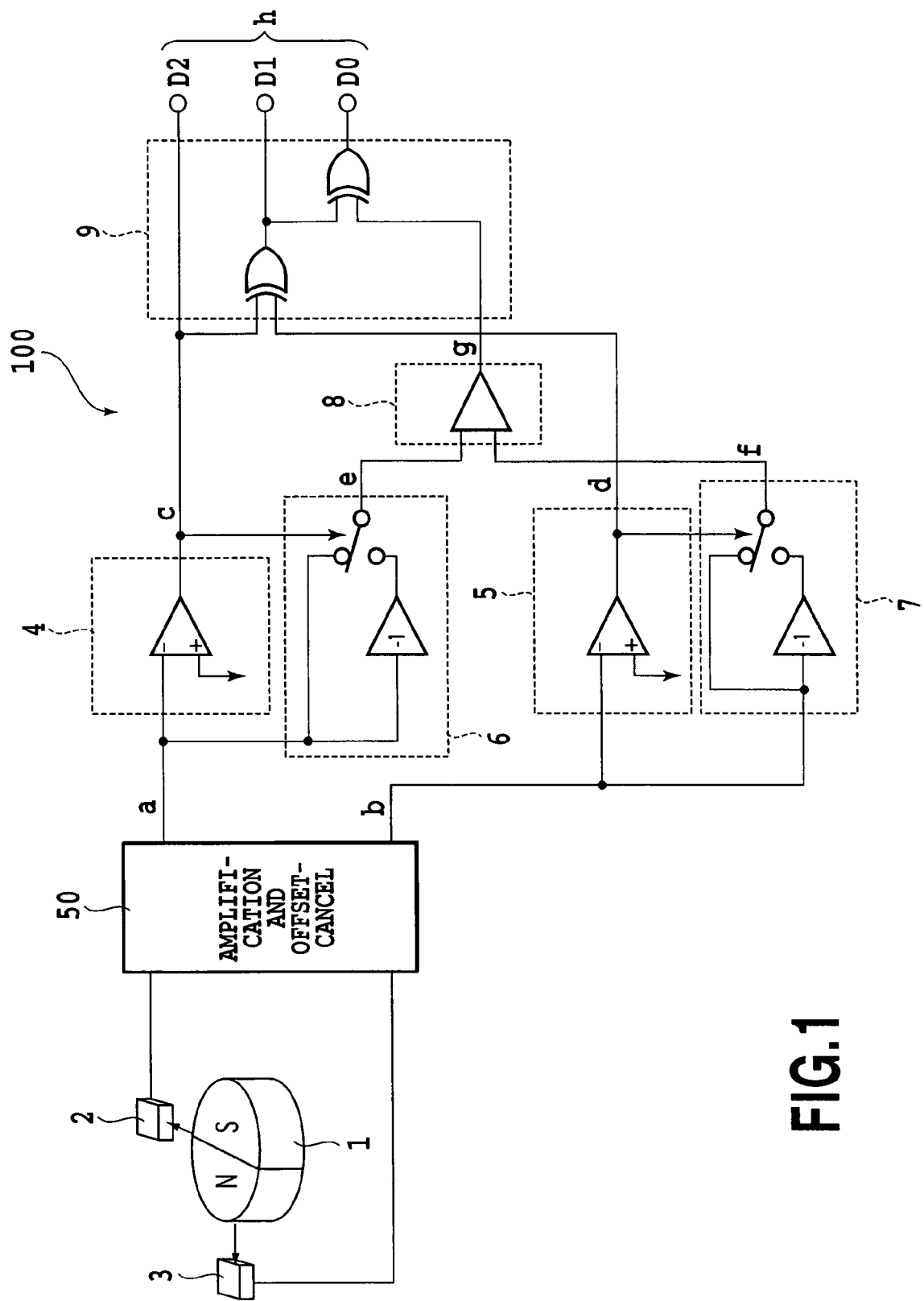
FIG. 1 is a circuit diagram showing the a magnetic rotation-angle sensor according to a first embodiment of the present invention.

FIG. 1 is a diagram showing the circuit configuration of a magnetic rotation-angle sensor 100 according to the present invention.

The sensor is configured with a magnet 1 having a pair of an N-polarity magnetic pole and an S-polarity magnetic pole, magnetic sensors 2 and 3, an amplification and offset-cancel circuit 50, polarity determination circuits 4 and 5, absolute-value generation circuits 6 and 7, a comparison circuit 8, and an angle determination circuit 9. In addition, the amplification and offset-cancel circuit 50 is not a necessitated structure element.

The magnetic sensors 2 and 3 are arranged around the magnet 1. The magnetic sensor 2 is spaced apart from the magnetic sensors 3 by an angle of 90° to the rotation center of the magnet 1.

The polarity determination circuits 4 and 5 determine the polarities of sensor output signals a and b outputted from the magnetic sensors 2 and 3. Thus, output polarity determination signals c and d indicating the determined polarities are outputted.

The absolute-value generation circuits 6 and 7 generate absolute values of e and f of the sensor output signals a and b outputted from the magnetic sensors 2 and 3.

The comparison circuit 8 compares the generated absolute values e and f and generates an absolute value comparison signal g indicating result of the comparison.

The angle determination circuit 9 determines the rotation angle of the magnet 1, based on the polarity determination signals c and d determined by the polarity determination circuits 4 and 5, and the absolute-value-comparison signal g compared by the comparison circuit 8. Then, a determination result signal h is outputted.

<Operation>

Next, an outline of operation of the apparatus will be described.

In FIG. 1, the magnet has a pair of magnetic poles, and the number N of magnetic sensors is two.

Figure 2:
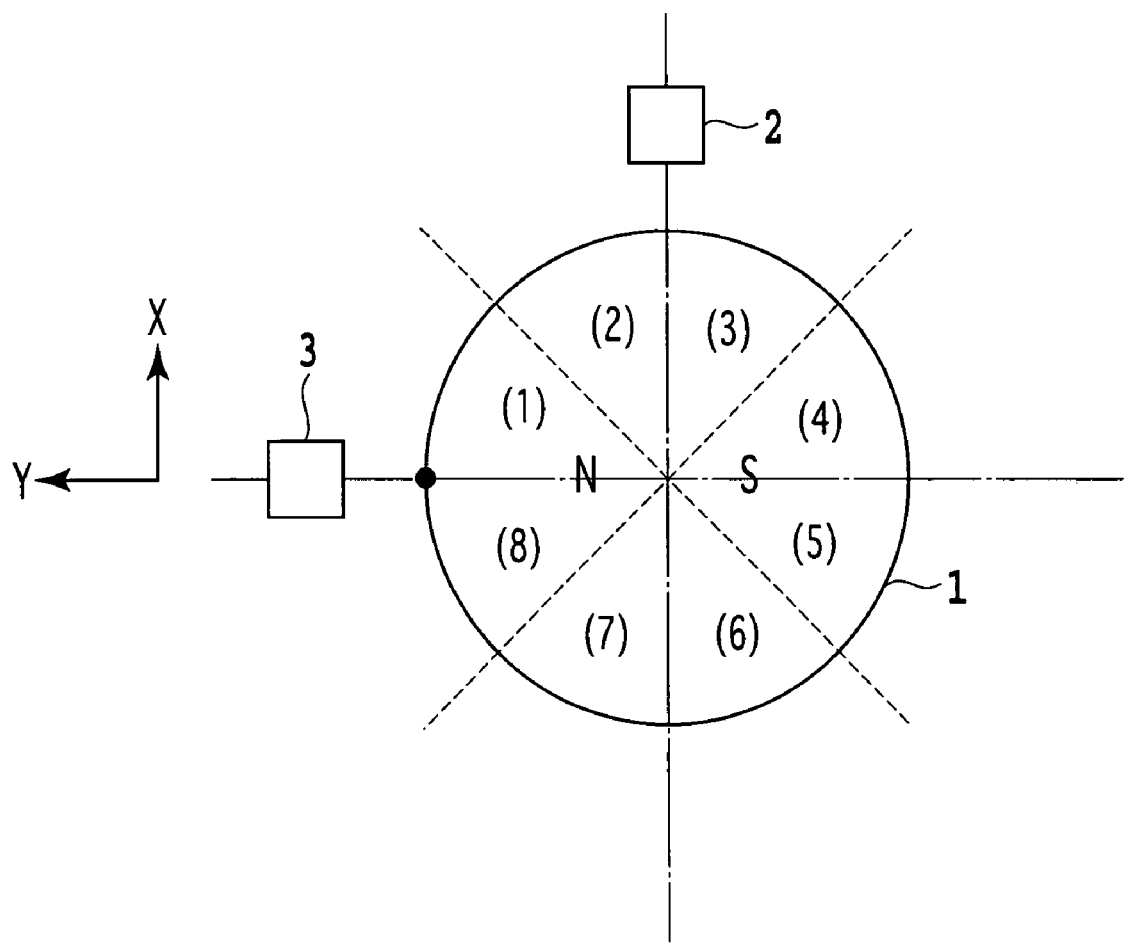
FIG. 2 is a schematic view showing divided regions and the positional relationship between a magnet and magnetic sensors.

FIG. 2 is a chart showing divided regions and the positional relationship between the magnet 1 and the magnetic sensors 2 and 3.

The magnetic sensors 2 and 3 are arranged with a predetermined angle around the rotating magnet 1 having a pair of an N-pole and an S-pole. At the predetermined angle, the magnetic sensor 2 is located on the extended line (along the X-axis direction) according to the boundary line between the poles, and the magnetic sensor 3 is located on the extended line (along the Y-axis direction) of the center line of the poles.

The sensor output signals a and b outputted from the magnetic sensors 2 and 3 are amplified according to the required value by the amplification offset-cancellation circuit 50. Thus, the offset-signal components are eliminated.

Figure 3:
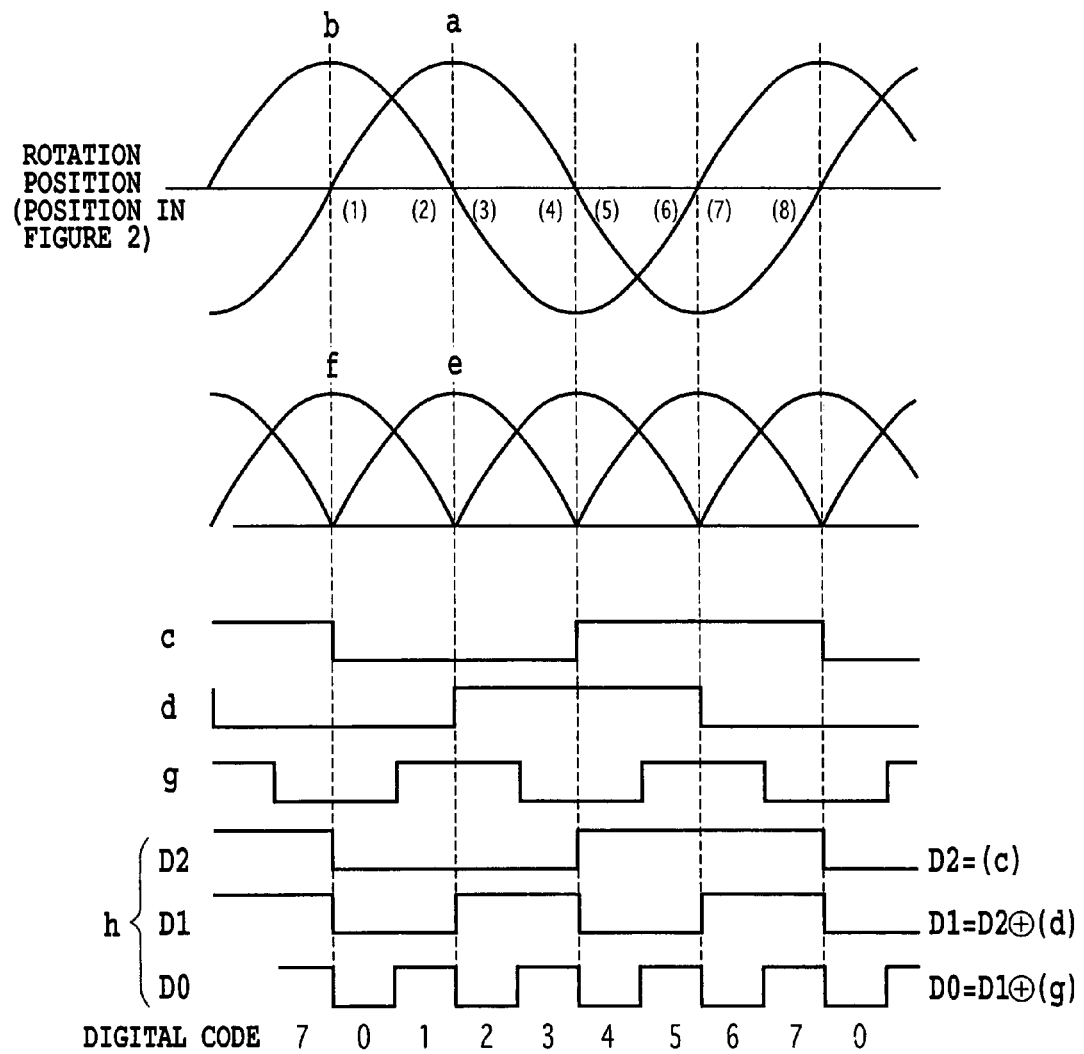
FIG. 3 is a set of waveform charts showing signals generated by the circuit of FIG. 1.

FIG. 3 shows signal waveforms generated by the circuit of the magnetic rotation-angle sensor 100.

When the magnet 1 is located at the extended line of the center line of the poles, output values of the sensor output signals a and b are maximum. When the magnet 1 is located at the extended line of the opposite pole, output values of the sensor output signals are minimum. When the magnet 1 is located at the extended line of the boundary line between the poles, output values of the sensor output signals are zero.

The sensor output signals a and b are inputted to the polarity determination circuits 4 and 5 for determining whether or not the sensor output signals are larger than zero. Then, the polarity determination signals c and d are outputted. In the example of FIG. 1, as shown in FIG. 3, A value "0" is outputted when the sensor output signals a and b are larger than zero. A value "1" is outputted when the sensor output signals a and b are smaller than zero.

The sensor output signals a and b are inputted to the absolute-value generation circuits 6 and 7. Then, the absolute values e and f corresponding to the sensor output signals are generated.

Absolute values e and f are inputted to the comparison circuit 8 that compares amplitudes of the absolute values e and f. Thus, the absolute-value-comparison signal g is outputted. In the example of FIG. 1, as shown in FIG. 3, as the absolute-value-comparison signal g, "1" is outputted when the absolute value e is larger than the absolute value f. A value "0" is outputted when the absolute value e is smaller than the absolute value f.

The polarity determination signals c and d and the absolute-value-comparison signal g are inputted to the angle determination circuit 9. Then, when the magnet 1 is rotated by 360°, the determination result signal h having angular resolution of $2^{(N+1)}=8$ is outputted.

FIG. 4 is a table showing a relationship between rotation angle of the magnet 1 and determination result signal h.

In the example shown in FIG. 1, as the determination result signal h, a 3-bit binary code 150 can be obtained.

<Generation Principle for Determination Result Signal h>

The principle of generating the determination result signal h shown in FIG. 3 will be described below.

In FIG. 2, when the magnetic sensor "2" is located at the extended line of the boundary line between the N-pole and the S-pole of the magnet 1 and the magnetic sensor "3" is located at the extended line of the center line of the N-pole, the positions of the magnetic sensors 2 and 3 are defined as 0°.

In the initial state, the amplification and offset cancellation circuit 50 is registered such that the sensor output signal a as the output of the magnetic sensor 2 is set to zero and the sensor output signal b as the output of the magnetic sensor 3 is set to maximum.

Next, from the initial state, when the magnet 1 is rotated clockwise by 360°, the sensor output signals a and b are varied as shown signal waveforms of FIG. 3.

The absolute values e and f as the output of the absolute-value circuits 6 and 7 are varied as shown signal waveforms of FIG. 3.

The polarity determination signals c and d as the output of the polarity determination circuits 4 and 5 and the absolute-value-comparison signal g as the output of the comparison circuit 8 are described as signal waveforms of FIG. 3. Any one of output signals are varied such that eight division regions (1) to (8) of FIG. 2 are created according to rotation by 45°.

The angle determination circuit 9 is configured such that D2 is the polarity determination signal c, D1 is an output signal from the exclusive OR of D2 and the polarity determination signal d, and D0 is an output signal from the exclusive OR of D1 and the absolute-value-comparison signal g. The determination result signals h as output are varied as shown in FIG. 3, and become the binary code 150 as shown in FIG. 4.

The determination result signals h are inputted to the ports of a microcomputer or the like, and then the rotation position of the magnet 1 can be determined.

<Relationship between Magnet and Sensor>

The intensity of the magnet 1, the sensitivity of the magnetic sensors 2 and 3, or the positional relationship between the magnet 1 and the magnetic sensors 2 and 3 is changed to vary amplitudes of the sensor output signals a and b outputted from the magnetic sensors 2 and 3. However, as long as the amplitudes between the sensor output signals a and b are not changed relatively, rotation angles according to the binary code 150 are not changed.

Figure 5A:
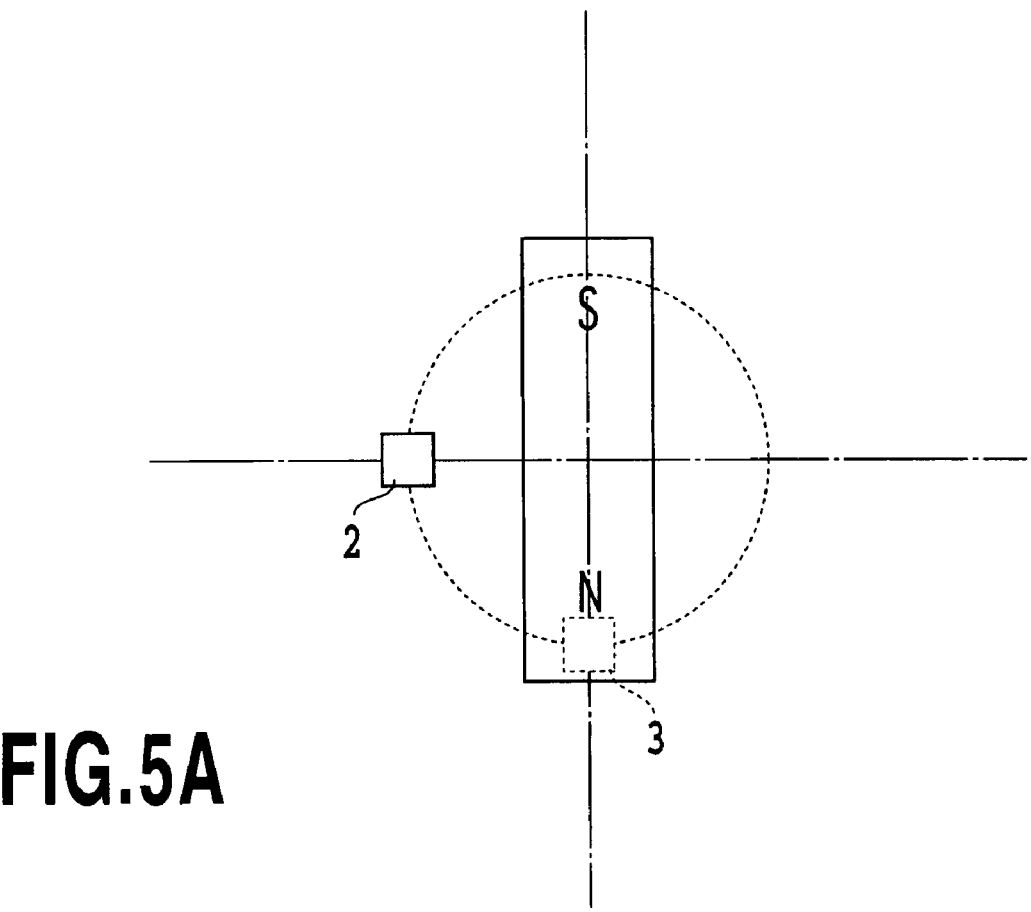
FIG. 5A is a plan view showing an example of a magnet having a different shape.
Figure 5B:
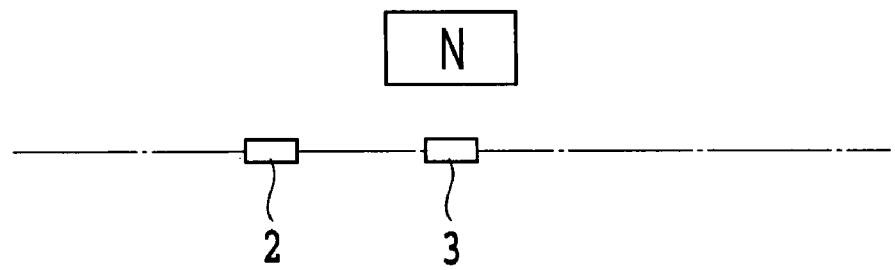
FIG. 5B is a side view showing an example of a magnet having a different shape.

FIGS. 5A and 5B are other examples of the magnet having a different shape.

Figure 6:
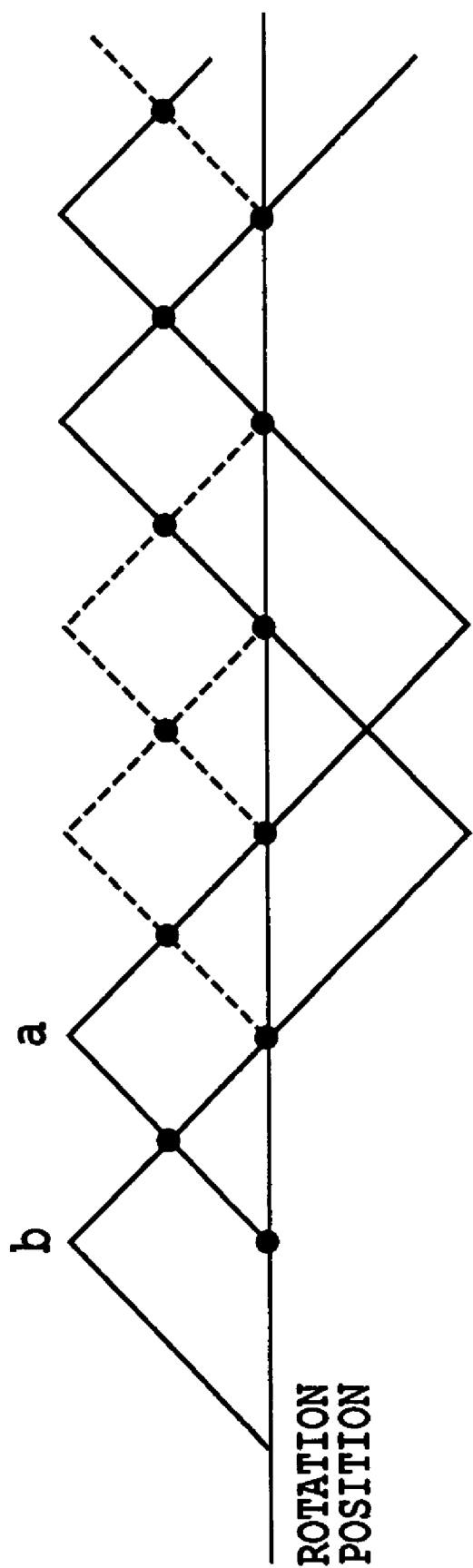
FIG. 6 is a schematic view showing a relationship between rotation angle of divided regions and waveforms of sensor output signals.

FIG. 6 is a schematic view of FIGS. 5A and 5B. Even though the waveforms of the sensor output signals are changed, rotation angles according to the divided regions are not changed.

As shown in FIGS. 5A and 5B, when the shape of the magnet 1 and the positional relationship between the magnet 1 and the magnetic sensors 2 and 3 are changed, for example, the shape of the magnet 1 is changed into a rod-shaped magnet and the magnetic sensors 2 and 3 are arranged on a plane below the rod-shaped magnet. In this arrangement, the waveforms of the sensor output signals a and b outputted from the magnetic sensors 2 and 3 are varied. However, as long as the waveform of the sensor output signal a is the same as the sensor output signal b, rotation angles according to the binary code 150 are not changed.

As a result, it is made possible to produce a magnetic rotation-angle sensor that a simple circuit configuration can be obtained without increasing the number of magnetic poles and angular resolution can be improved.

Embodiment 2

A second embodiment of the present invention will be described with reference to FIGS. 7 to 10. The same reference numerals are applied to the parts corresponding to the first example and an explanation thereof is omitted.

<Circuit Configuration>

Figure 7:
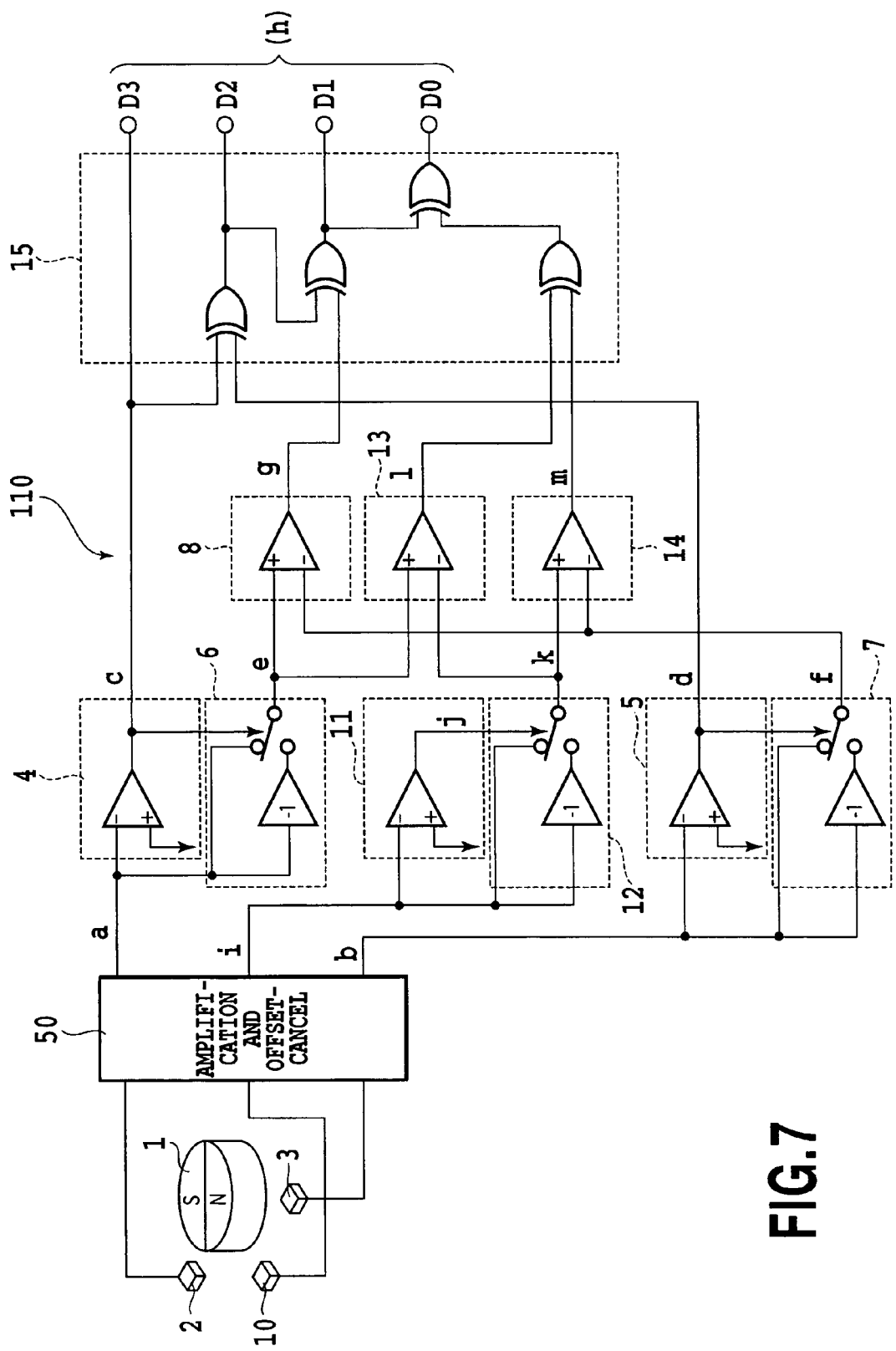
FIG. 7 is a circuit diagram showing a magnetic rotation-angle sensor according to a second embodiment of the present invention.

FIG. 7 is a diagram showing the circuit configuration of a magnetic rotation-angle sensor 110 according to the present invention.

The sensor is configured with a magnet 1 having a pair of an N-polarity magnetic pole and an S-polarity magnetic pole, three magnetic sensors 2, 3 and 10, an amplification and offset-cancel circuit 50, polarity determination circuits 4, 5, and 11, absolute-value generation circuits 6, 7 and 11, comparison circuits 8, 13, and 14, and an angle determination circuit 15. In addition, the amplification and offset-cancel circuit 50 is not necessarily required to be provided.

The magnetic sensors 2 and 3 are arranged around the magnet 1. The magnetic sensor 2 is spaced apart from the magnetic sensor 3, by a predetermined angle of 90° with respect to the rotation center of the magnet 1. The magnetic sensor 10 is arranged at a middle position between the magnetic sensors 2 and 3.

The polarity determination circuits 4, 5, and 11 determine the polarities of sensor output signals a, b, and i outputted from the magnetic sensors 2, 3, and 10. Thus, output polarity determination signals c, d, and j indicating the determined polarities are outputted.

The absolute-value generation circuits 6, 7, and 12 generate the absolute values of e, f, and k of sensor output signals a, b, and i outputted from the magnetic sensors 2, 3, and 10.

The comparison circuits 8, 13, and 14 compare the generated absolute values e, f, and k and generate absolute-value-comparison signals g, l, and m indicating the results of the comparisons.

The angle determination circuit 15 determines the rotation angle of the magnet 1 based on the polarity determination signals c, d, and j determined by the polarity determination circuits 4, 5, and 11, and the absolute-value-comparison signals g, l, and m compared by the comparison circuit 8, 13, and 14. Then, a determination result signal h is outputted.

<Operation>

Next, an outline of operation of the apparatus will be described.

The magnet 1 has a pair of magnetic poles, and the number N of magnetic sensors is three.

Figure 8:
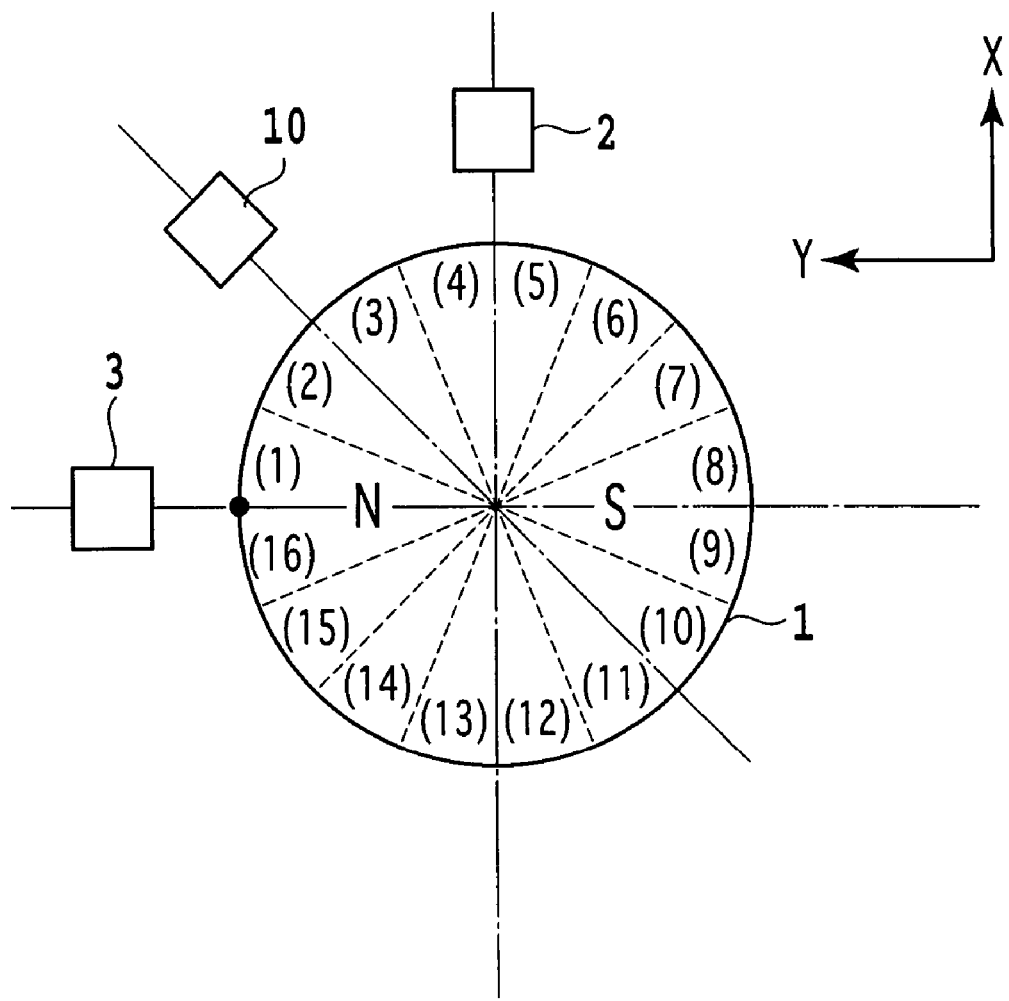
FIG. 8 is a schematic view showing divided regions and the positional relationship between a magnet and magnetic sensors.

FIG. 8 is a chart showing divided regions and the positional relationship between the magnet 1 and the magnetic sensors 2 and 3.

The magnetic sensors 2 and 3 are arranged with a predetermined angle around the rotating magnet 1 having a pair of an N-pole and an S-pole. At the predetermined angle, the magnetic sensor 2 is located at the extended line (along the X-axis direction) of the boundary line between the poles, and the magnetic sensor 3 is located at the extended line (along the Y-axis direction) of the center line of the poles. Further, another magnetic sensor 10 is arranged at the middle position between the magnetic sensors 2 and 3.

Figure 9:
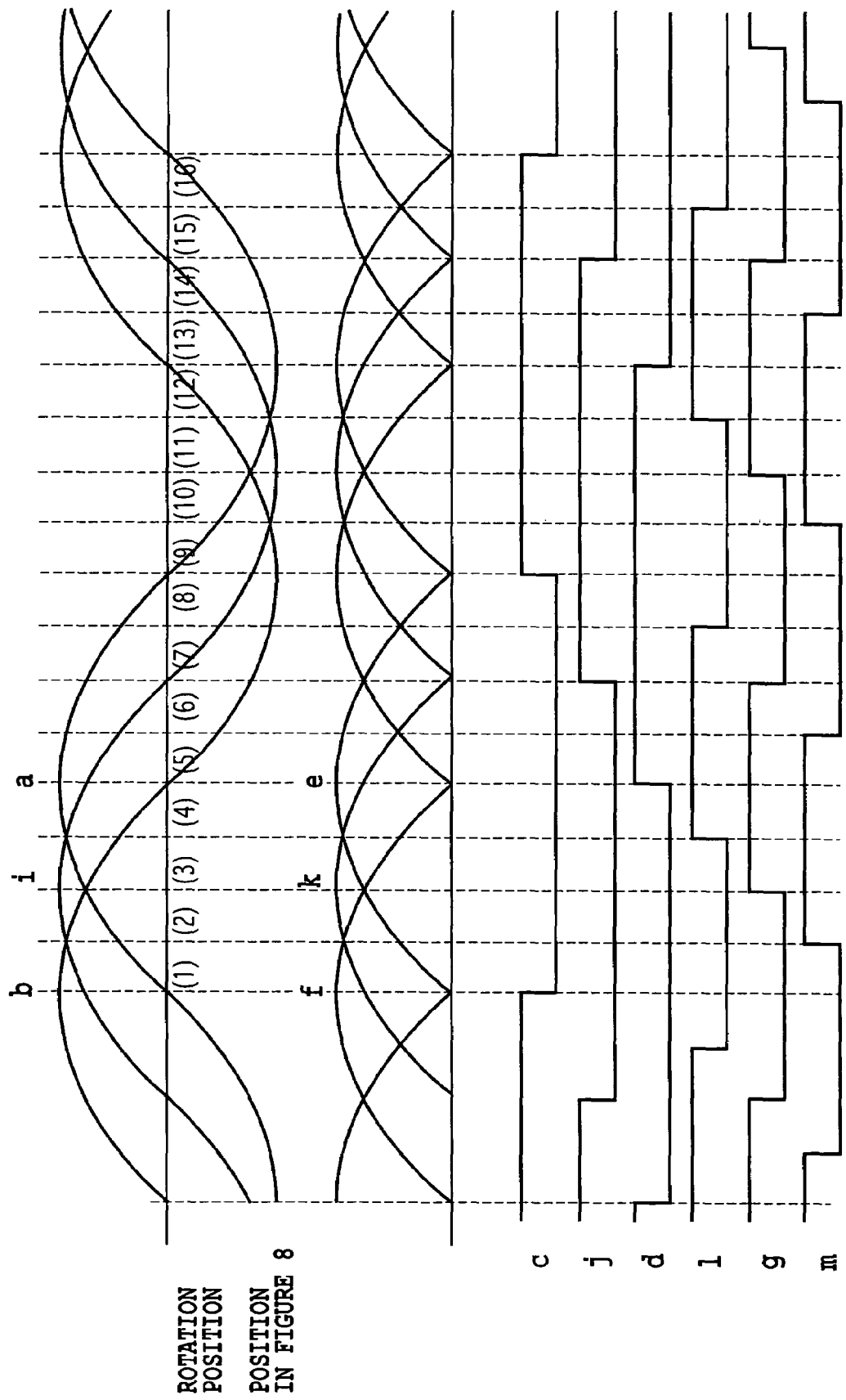
FIG. 9 is a set of waveform charts showing signals generated by the circuit of FIG. 7.

FIG. 9 shows signal waveforms generated by the circuit of the magnetic rotation-angle sensor 110.

The sensor output signals a, b, and i outputted from the magnetic sensors 2, 3, and 10 are amplified according to the required value by the amplification and offset-cancellation circuit 50. Thus, the offset-signal components are eliminated.

When the magnet 1 is located at the extended line of the center line of the poles, output values of the sensor output signals a, b, and i are maximum. When the magnet 1 is located at the extended line of the opposite pole, output values of the sensor output signals a, b, and i are minimum. When the magnet 1 is located at the extended line of the boundary line between the poles, output values of the sensor output signals a, b, and i are zero.

The sensor output signals a, b, and i are inputted to the polarity determination circuits 4, 5, and 11 for determining whether or not the sensor output signals are larger than zero. Then, the polarity determination signals c, d, and j are outputted. In the example of FIG. 7, as shown in FIG. 9, as each of the polarity determination signals c, d, and j, "0" is outputted when the sensor output signals a, b, and i are larger than zero, and "1" is outputted when the sensor output signals a, b, and i are smaller than zero.

The sensor output signals a, b, and i are inputted to the absolute-value generation circuits 6, 7, and 12. Then, the absolute values e, f, and k corresponding to the sensor output signals are generated.

The absolute values e and f are inputted to the comparison circuit 8 that compares amplitudes of the absolute values e and f. Then, the absolute-value-comparison signal g is outputted. In the example of FIG. 7, as shown in FIG. 9, as the absolute-value-comparison signal g, "1" is outputted when the absolute value e is larger than the absolute value f, and "0" is outputted when the absolute value e is smaller than the absolute value f.

The absolute values e and k are inputted to the comparison circuit 13 that compares amplitudes of the absolute values e and k. Then, the absolute value comparison signal l is outputted. In the example of FIG. 7, as shown in FIG. 9, as the absolute-value-comparison signal l, "1" is outputted when the absolute value e is larger than the absolute value k, and "0" is outputted when the absolute value e is smaller than the absolute value k.

The absolute values k and f are inputted to the comparison circuit 14 that compares amplitudes of the absolute values k and f. Then, the absolute-value-comparison signal m is outputted. In the example of FIG. 7, as shown in FIG. 9, as the absolute-value-comparison signal m, "1" is outputted when the absolute value k is larger than the absolute value f, and "0" is outputted when the absolute value k is smaller than the absolute value f.

The polarity determination signals c and d and the absolute-value-comparison signal g, l, and m are inputted to the angle determination circuit 15. Then, when the magnet 1 is rotated by 360°, the determination result signal h having the angular resolution of $2^{(N+1)}=16$ is outputted.

FIG. 9 is a set of charts showing signal waveforms generated by the circuit of the magnetic rotation-angle sensor 110.

FIG. 10 is a table showing the relationship between the rotation angle of the magnet 1 and the determination result signal h.

In the example of FIG. 7, as the determination result signal h, a 4-bit binary code 160 can be obtained.

<Generation Principle for Determination Result Signal h>

The principle of generating the determination result signal h of FIG. 9 will be described below.

In FIG. 8, when the magnetic sensor 2 is located at the extended line of the boundary line between the N-pole and the S-pole of the magnet 1, and the magnetic sensor 3 is located at the extended line of the center line of the N-pole, the positions of magnetic sensors 2 and 3 are defined as 0°.

In the initial state, the amplification and offset-cancel circuit 50 is registered that the sensor output signal a as output of the magnetic sensor 2 is set to zero and the sensor output signal b as the output of the magnetic sensor 3 is set to maximum.

Next, from the initial state, when the magnet 1 is rotated clockwise by 360°, the sensor output signals a, b, and i are varied as shown signal waveforms of FIG. 9.

The absolute values e, f, and k as the output of the absolute-value circuits 6, 7, and 12 are varied as shown signal waveforms of FIG. 9.

The polarity determination signals c, d, and j as the output of the polarity determination circuits 4, 5, and 11, and the absolute-value-comparison signal g, l, and m as the output of the comparison circuits 8, 13, and 14 are described as shown signal waveforms of FIG. 9. Any one of the six signals is varied such that 16 divisions regions (1) to (16) of FIG. 8 are created according to rotation by 22.5°.

The angle determination circuit 15 is configured such that D3 is the polarity determination signal c, D2 is an output signal as the exclusive OR of D3 and the polarity determination signal d, D1 is an output signal as the exclusive OR of D2 and the absolute-value-comparison signal g, and D0 is an output signal from the exclusive OR of D1 and an output signal from the exclusive OR of the absolute value comparison signals l and m. Then, signals becomes the binary code 160 as shown in FIG. 10.

The output is inputted to the ports of a microcomputer or the like, and then the rotation position of the magnet 1 can be determined.

<Relationship between Magnet and Sensor>

The intensity of the magnet 1, the sensitivity of the magnetic sensors 2, 3, and 10, or the positional relationship between the magnet 1 and the magnetic sensors 2, 3, and 10 is changed to vary amplitudes of the sensor output signals a, b, and i outputted from the magnetic sensors 2, 3, and 10. However, as long as the amplitudes between the sensor output signals a, b, and i are not changed relatively, rotation angles according to binary code 160 are not changed.

When the shape of the magnet 1 or the positional relationship between the magnet 1 and the magnetic sensors 2, 3, and 10 is changed, the waveforms of the sensor output signals a, b, and i outputted from the magnetic sensors 2, 3, and 10 are changed. However, as long as the waveforms of the sensor output signals a, b, and i are the same, rotation angles according to the binary code 160 are not changed.

As a result, it is made possible to produce a magnetic rotation-angle sensor that a simple circuit configuration can be obtained without increasing the number of magnetic poles and angular resolution can be improved.

Embodiment 3

A third embodiment of the present invention will be described with reference to FIGS. 11 and 12. The same reference numerals are applied to the parts corresponding to the above described embodiments and an explanation thereof is omitted.

The third example is an example of a pair of magnetic sensors, such as the magnetic rotation-angle sensors 100 of FIG. 1 or the magnetic rotation-angle sensors 110 of FIG. 7 that are arranged around the magnet 1.

Figure 11:
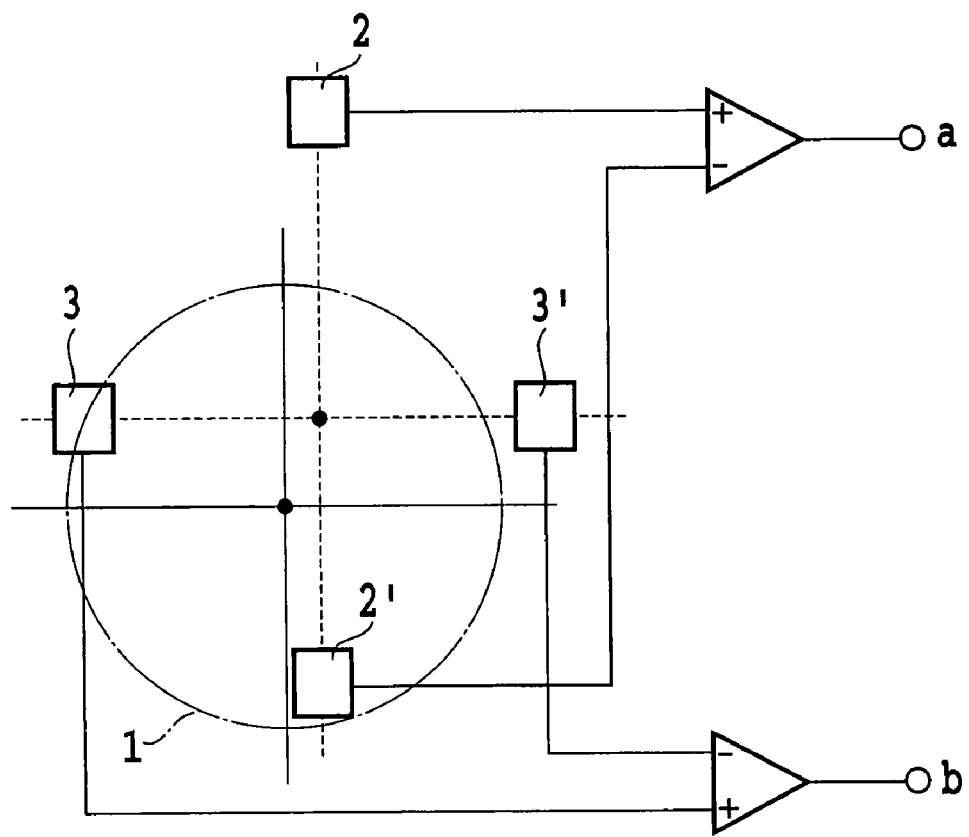
FIG. 11 is a schematic view showing the effect of mounting-position deviation between a magnet and pairs of magnetic sensors according to a third embodiment of the present invention.

FIG. 11 shows a pair of the magnetic sensors 2 and 3 of FIG. 1 according to the first example. in Embodiment 1 described above are configured as respective pairs.

A pair of the magnetic sensor 2 and a magnetic sensor 2' is arranged at a diagonal line X that passes through the rotation center of the magnet 1. Similarly, a pair of magnetic sensor 3 and a magnetic sensor 3' is arranged at a diagonal line Y.

As described above, in the case that two pairs of magnetic sensors are arranged and differences according to each pair are regarded as the sensor output signals a and b, output signals can be detected under stable state even though positional relationships are varied such as the change of the shape of the magnet 1 or the axis deviation of magnetic sensors from the center axis.

Figure 12:
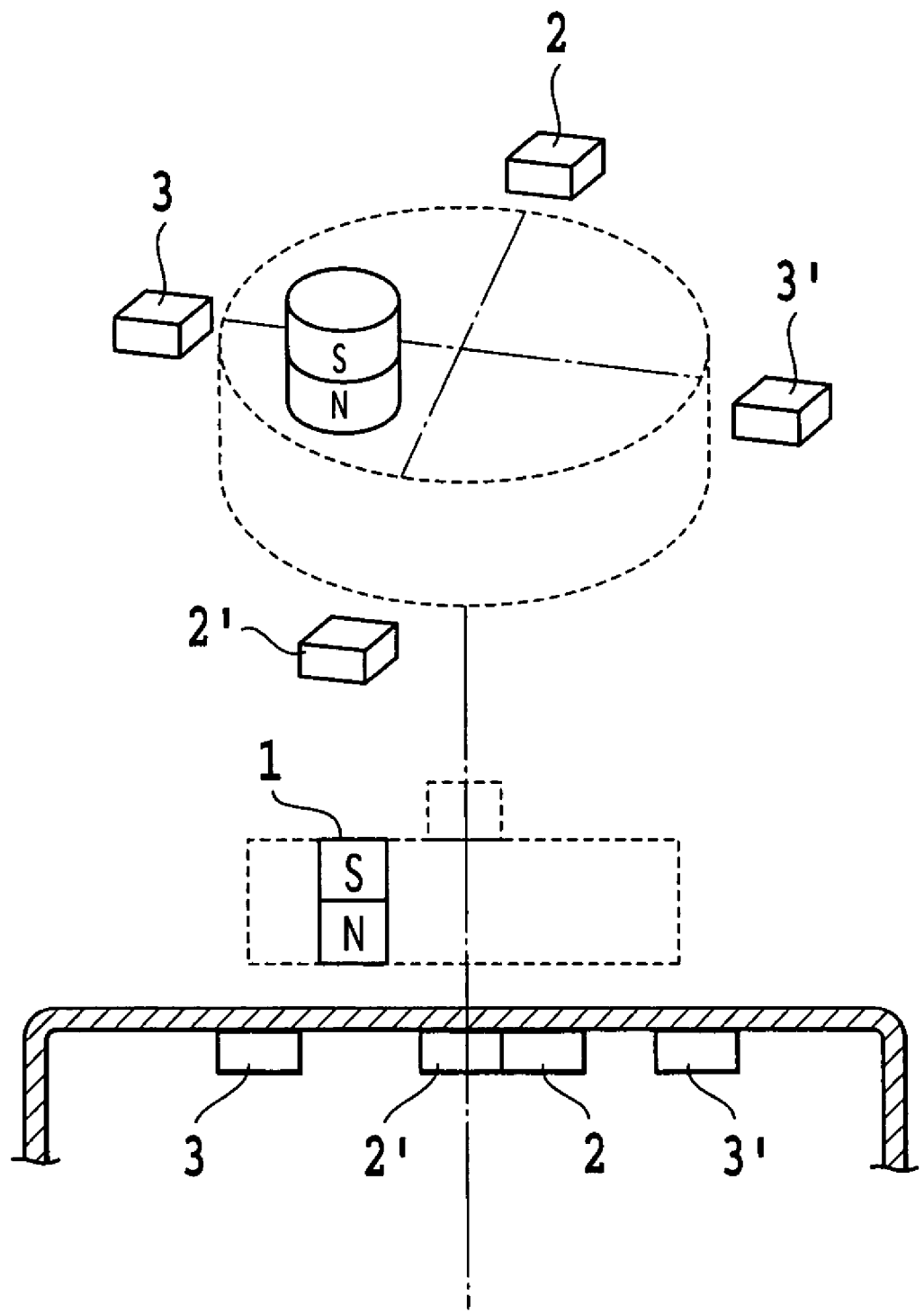
FIG. 12 is a schematic view showing an another structure including a magnet having a different shape and pairs of magnetic sensors.

FIG. 12 shows an example that the magnet 1 is deviated from the center axis.

The pair of magnetic sensors 2 and 2' and the pair of magnetic sensors 3 and 3' are used. Thus, even though a polarized type of the magnet 1 is arranged eccentrically from the center of the rotation axis, the sensor output signals a and b can be detected accurately.

In the case that the magnetic sensors 2, 3, and 10 shown in FIG. 7 of the second example are configured as pairs respectively, advantageous results as described above can be obtained similarly.

As described above, it is to produce a magnetic rotation-angle sensor that angle information can be obtained under stable state, regardless of the variation due to the accuracy of the assembly positions between the magnet 1 and the magnetic sensors 2 and 3 (or the magnetic sensors 2, 3, and 10) as well as the variation due to the sensitivity of the sensors.

Embodiment 4

A fourth embodiment of the present invention will be described with reference to FIGS. 13 and 14. The same reference numerals are applied to the parts corresponding to the above described embodiments and an explanation thereof is omitted.

An angle-information processing device is configured that the digital determination result signal h outputted from the magnetic rotation-angle sensor 100 of FIG. 1 or the magnetic rotation-angle sensor 110 of FIG. 7 is retrieved as an analogue signal and that the analogue signal is processed.

Figure 13:
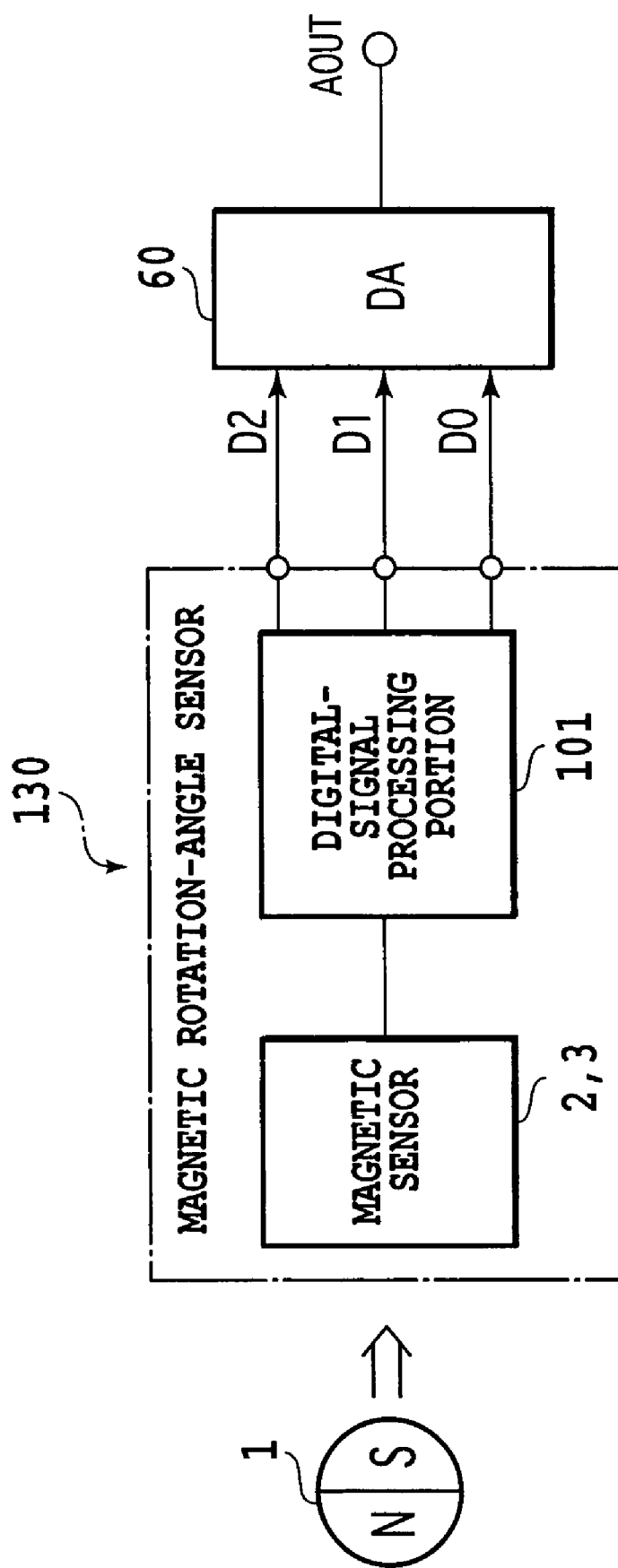
FIG. 13 is a block diagram showing an example of an angle-information processing device having a DA-conversion circuit connected to an angle determination circuit according to a fourth embodiment of the present invention.
Figure 14:
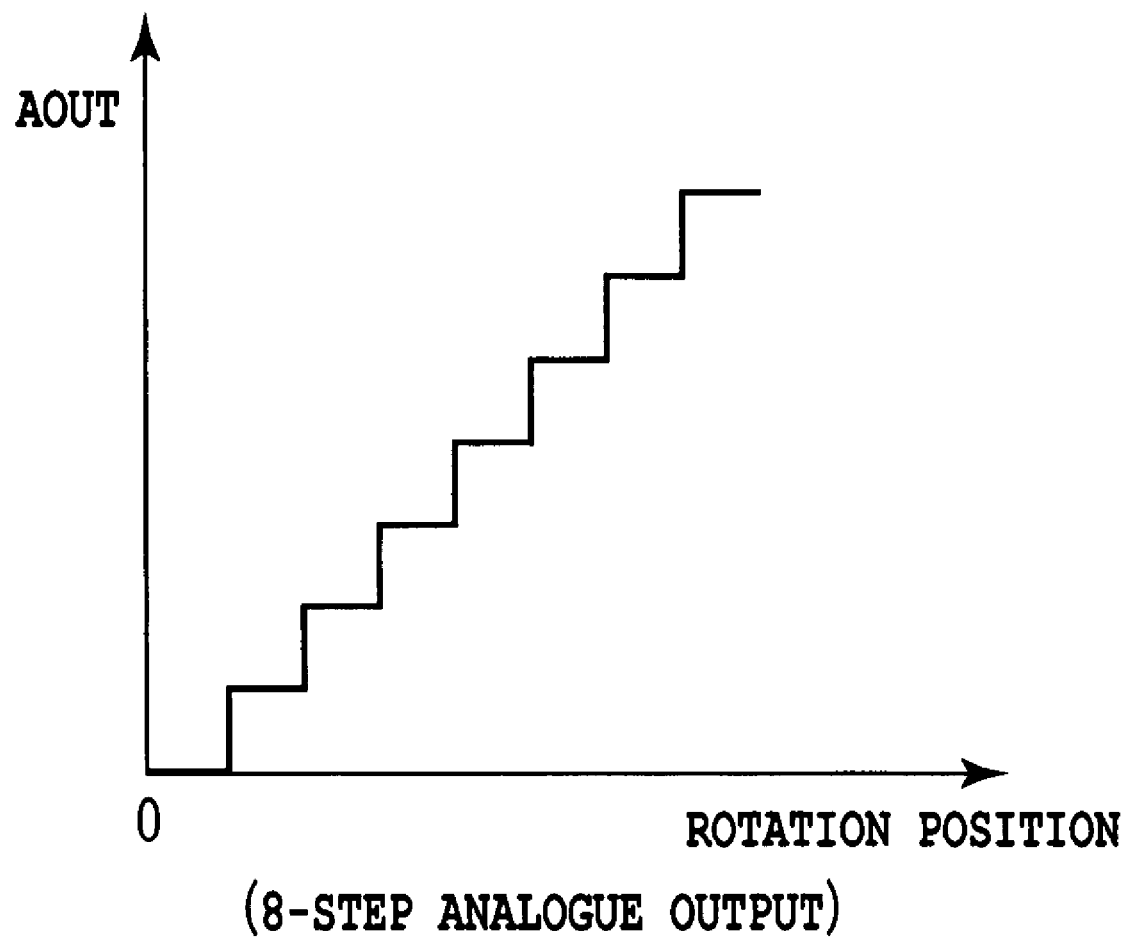
FIG. 14 is a schematic view showing an analogue signal including 8-step level conversion.

FIG. 13 shows an angle-information processing device 130 to which the magnetic rotation-angle sensor 100 of the first example shown in FIG. 1 is applied.

The angle-information processing device 130 is configured with the magnet 1 arranged outside the sensor and the magnetic rotation-angle sensor 100. The magnetic rotation-angle sensor 100 is configured as a structure having the magnetic sensors 2 and 3 and a digital-signal processing portion 101. The digital-signal processing portion 101 corresponds to a circuit portion for generating the determination result signal h based on the sensor output signals a and b of FIG. 1.

FIG. 13 shows an example of an angle-information processing device 130 having a DA-conversion circuit 60 connected to the digital-signal processing portion 101.

The DA-conversion circuit 60 converts the determination result signal h consisting of digital signals D0, D1, and D2 to an analogue signal AOUT. As shown in FIG. 14, the analogue signal AOUT can be outputted as an 8-step level-convertible output signal.

Figure 22A:
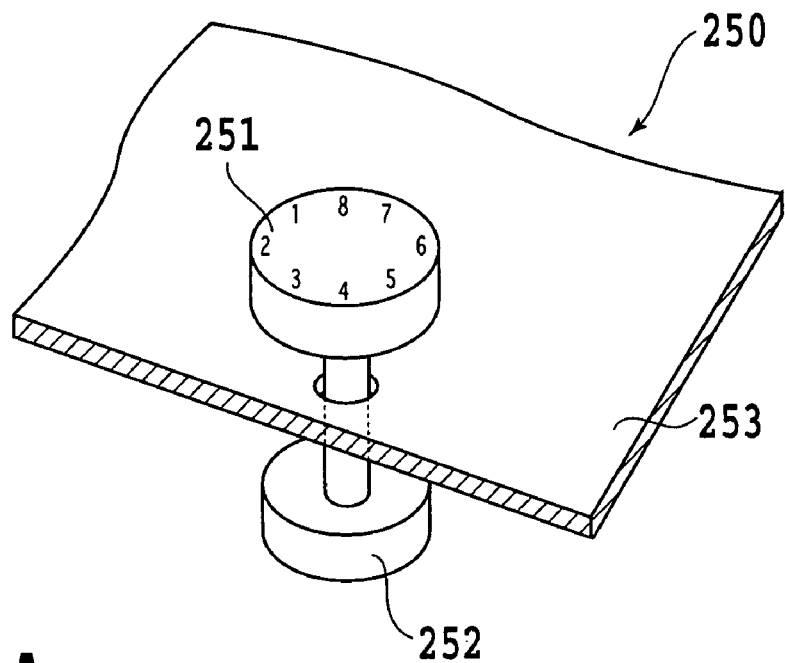
FIG. 22A is a perspective view showing a second conventional example of a contact-type rotation-angle sensor.
Figure 22B:
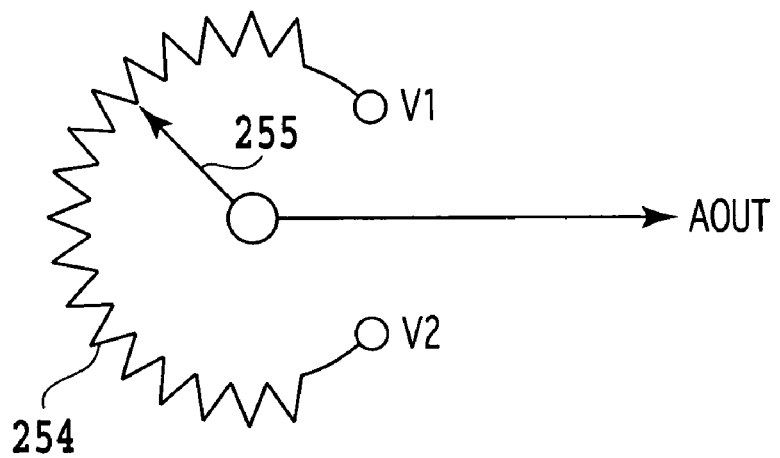
FIG. 22B is a schematic view showing a second conventional example of a contact-type rotation-angle sensor.

Moreover, by using the analogue signal AOUT that is level-converted into several steps, the number of sensor read signals can be reduced. Moreover, The angle-information processing device 130 is replaced by a conventional rotation angle sensor as shown in FIG. 22A or 22B without changing a signal reading method.

Similarly, in the magnetic rotation-angle sensor 110 shown in FIG. 7, the DA-conversion circuit 60 may be connected to the angle determination circuit 15. In this case, the analogue signal AOUT can be outputted as a 16-step level-convertible output signal.

Embodiment 5

A fifth embodiment of the present invention will be described with reference to FIG. 15. The same reference numerals are applied to the parts corresponding to the above described embodiments and an explanation thereof is omitted.

This example is a configuration of an angle-information processing device including the magnetic rotation-angle sensor 100 of FIG. 1 or the magnetic rotation-angle sensor 110 of FIG. 7.

Figure 15:
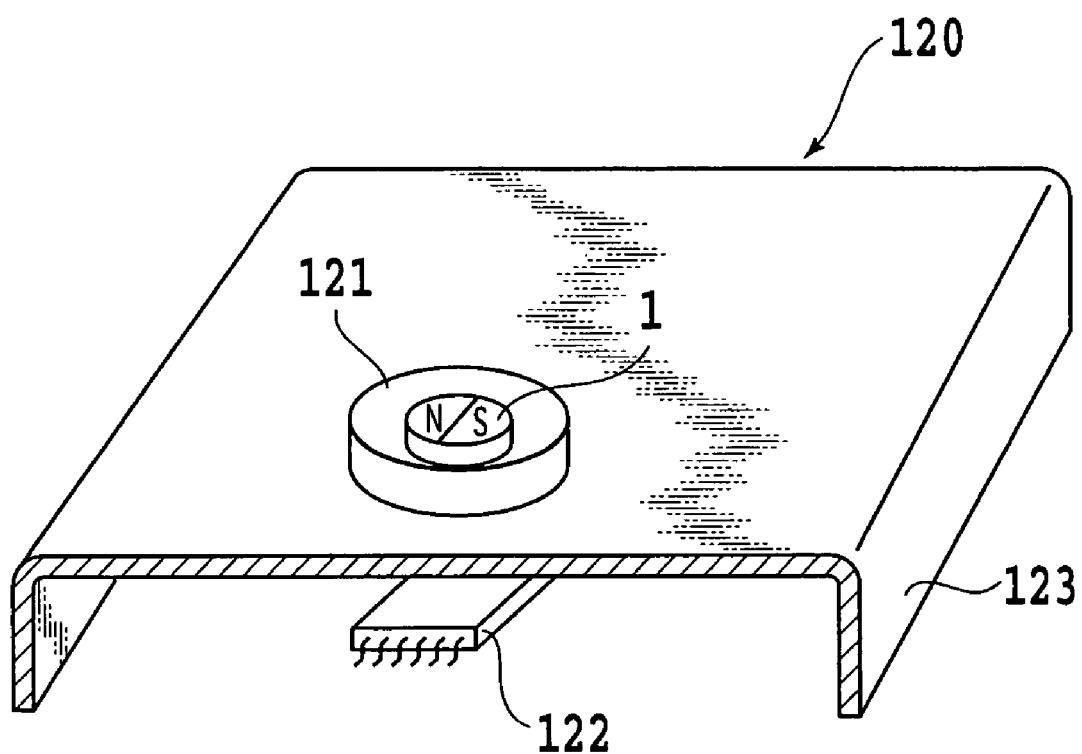
FIG. 15 is a schematic view showing an example of a rotary switch which is applicable to shooting mode selection of a digital still camera according to a fifth embodiment of the present invention.

FIG. 15 shows a rotary switch 120 that is applicable to shooting mode selection of a digital still camera.

The rotary switch 120 is configured with a rotary dial portion 121 including the magnet 1 and a sensor main body 122 including a magnetic sensor.

The rotary dial portion 121 is mounted on a surface of a camera case 123. An IC-chip-shaped sensor main body 122 is incorporated in the camera case 123 and is located under the rotary dial portion 121.

The sensor main body 122 includes a circuit having the magnetic sensors 2 and 3 (or the magnetic sensors 2, 3, and 10) of the magnetic rotation-angle sensor 100 of FIG. 1 or the magnetic rotation-angle sensor 110 of FIG. 7 without the magnet 1.

The sensor main body 122 may be configured by an angle-information processing device that processes an analogue signal by converting the digital determination result signal h outputted from the magnetic rotation-angle sensor as shown in the fourth example.

As described above, a magnetic sensor is integrated in the sensor main body 122 to make an IC chip. It is possible to provide an device in which compactness, light weight, and reduction of the number of components can be performed compared with the mechanical switch structure of FIG. 17. In addition, the rotary dial portion 121 located inside of the case 123 can be completely separated from the sensor main body 122 located outside. Thus, a water-proof and dust-proof structure can be easily obtained.

Another angle-information processing device may be configured as a controller for a cellular phone, a personal computer, an audio-apparatus main body, a household electric appliance, or the like.

Embodiment 6

A sixth embodiment of the present invention will be described with reference to FIGS. 16 and 20. The same reference numerals are applied to the parts corresponding to the above described embodiments and an explanation thereof is omitted.

<Circuit Configuration>

Figure 16:
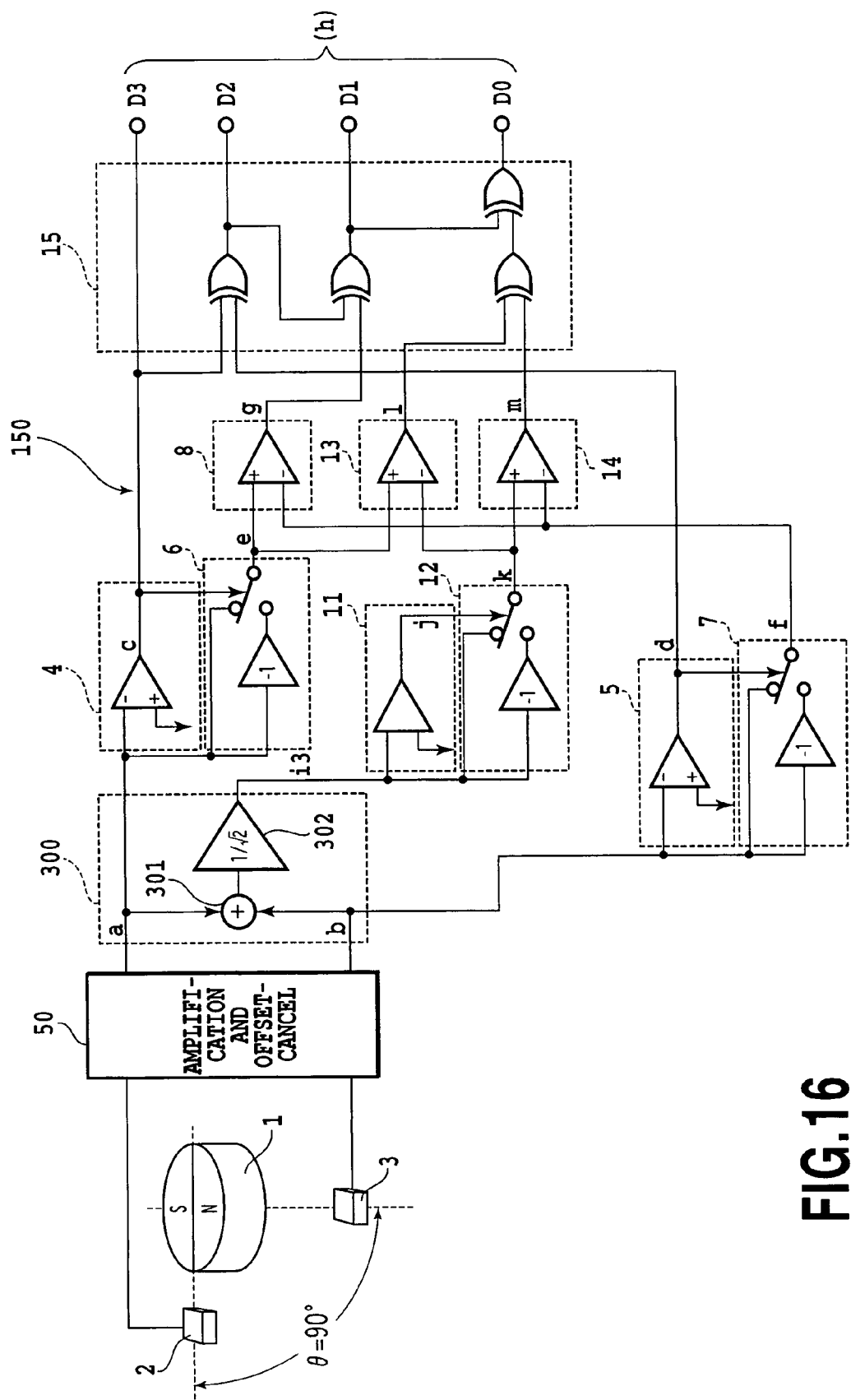
FIG. 16 is a circuit diagram showing a magnetic rotation-angle sensor according to a six embodiment of the present invention.

FIG. 16 shows a magnetic rotation-angle sensor 150 according to the present invention.

The magnetic rotation-angle sensor 150 includes an addition portion 300. In the addition portion 300, an input terminal is connected to the amplification and offset-cancel circuit 50, and an output terminal is connected to the polarity determination circuit 11 and the absolute-value generation circuit 12.

Other basic configurations are the same as those of the magnetic rotation-angle sensor 110 shown in FIG. 7 of the second example and thus the explanation will be omitted.

Figure 17:
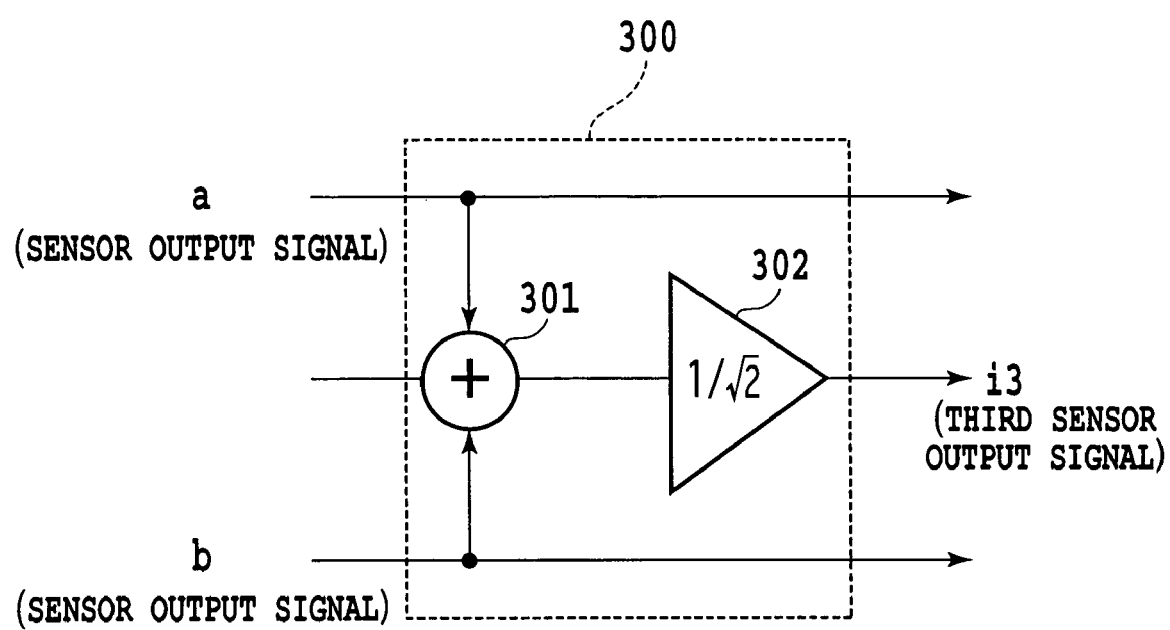
FIG. 17 is a circuit diagram showing an example of an addition portion.

FIG. 17 shows an example of the addition portion 300.

The addition portion 300 is configured by an adder 301 that adds the sensor output signals a and b and an amplifier 302 that has gain of $1/\sqrt{2}$ and outputs a third sensor output signal i3.

The third sensor output signal i3 is inputted to the polarity determination circuit 11 and the absolute-value generation circuit 12.

It is assumed that the number N of magnetic sensors is two, and the magnetic sensors 2 and 3 are disposed. It is assumed that the sensor output signals a and b are generated when the magnet 1 is rotated by 360°. Then, sensors are arranged such that a signal in proportion to sin A is produced from the magnetic sensor 2 and a signal in proportion to sin B is produced from the magnetic sensor 3.

When the magnet 1 is rotated by 360°, the resolution of $2^M$ (M is an arbitrary integer that is the same as or larger than four) per pair of magnetic poles is produced. The magnetic rotation-angle sensor 150 is an example of a 16-division rotation-angle sensor.

<Circuit Operation>

Figure 18:
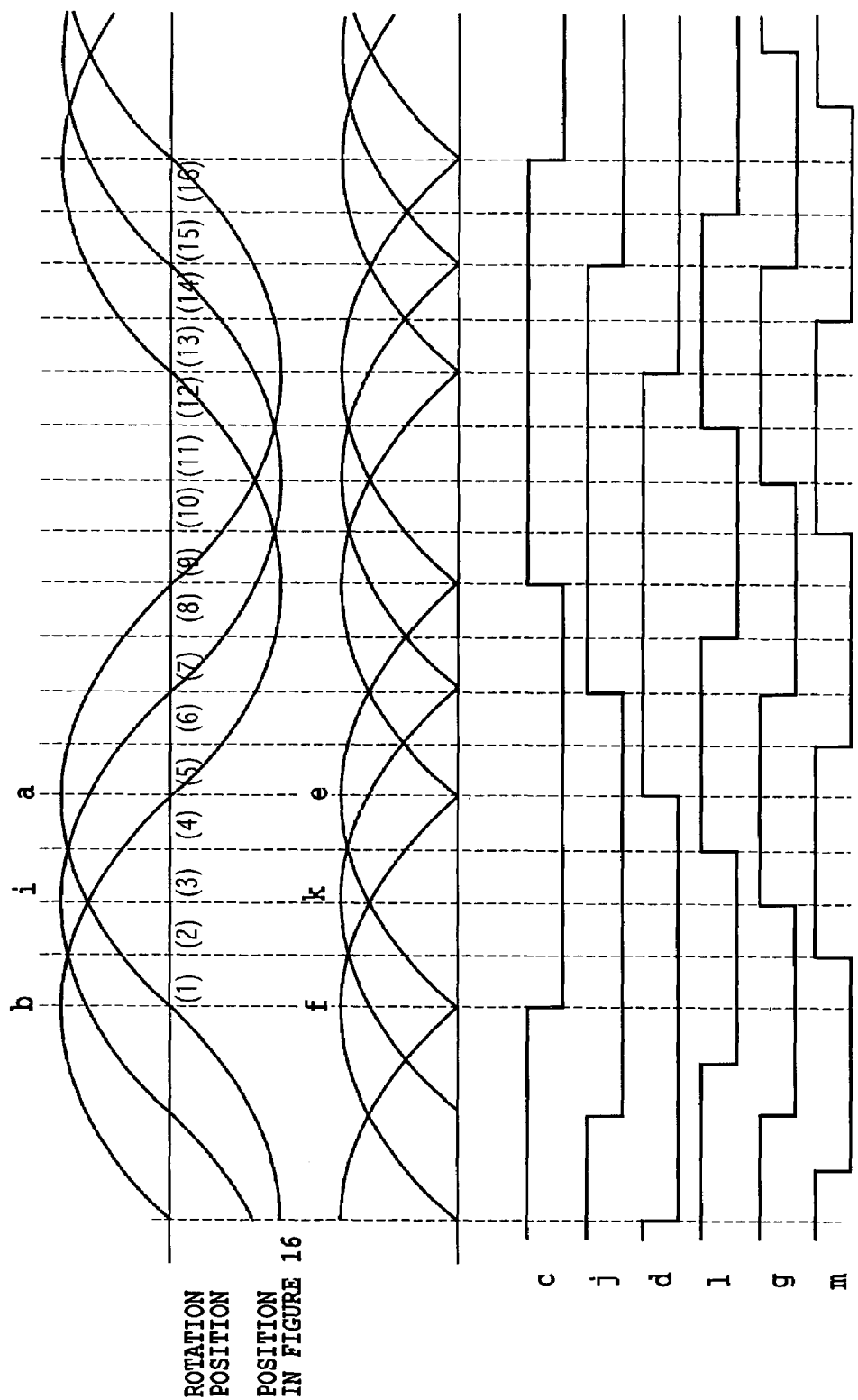
FIG. 18 is a set of waveform charts showing signals generated by the circuit of FIG. 16.

FIG. 18 shows signal waveforms generated by a circuit of the magnetic rotation-angle sensor 110.

Signal waveforms of FIG. 18 are basically the same as waveforms of FIG. 9 of the second example.

Assuming that the signal outputted from the magnetic sensor 2 is sin A and the signal outputted from the magnetic sensor 3 is sin B. Equation (1) below is given based on the theorem of the trigonometric function.

$$\sin A + \sin B = 2\sin\left(\frac{A+B}{2}\right) \cdot \cos\left(\frac{A-B}{2}\right) \quad \text{[Formula 1]}$$

Here, by arranging the sensors such that B=A+90°, Equation (2) below is represented.

$$\sin A + \sin(A + 90°) = \quad \text{[Formula 2]}$$
$$2\sin\left(A + \frac{90°}{2}\right) \cdot \cos\left(-\frac{90°}{2}\right) = \sqrt{2}\sin(A + 45°)$$

Equation (2) can be represented as Equation (3) below.

$$\sin(A + 45°) = \frac{1}{\sqrt{2}}(\sin A + \sin B) \quad \text{[Formula 3]}$$

Thus, the right arithmetic term of Equation (3) can be obtained.

The addition portion 300 shown in FIG. 17 cause the effect that a signal corresponding to the output signal i shown in FIG. 7 of the second example can be produced without providing magnetic sensor 10. Thus, the resolution of 16 divisions ($2^4$=16) can be obtained without increasing the number of sensors.

VARIANT EXAMPLE

Figure 19:
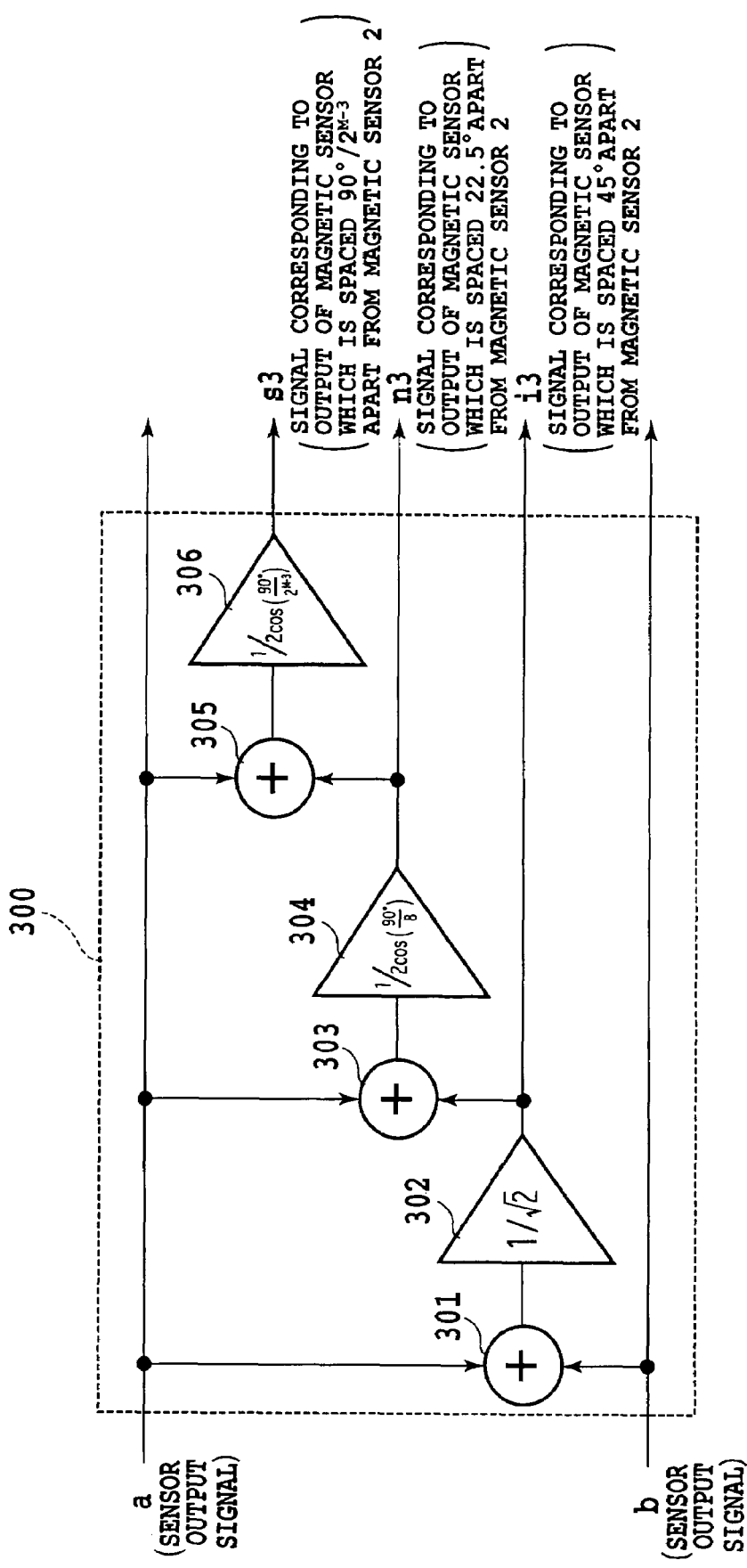
FIG. 19 is a circuit diagram showing an another example of the addition portion.

FIG. 19 is another example of the addition portion 300.

The addition portion 300 includes three adders 301, 303, and 305 and three amplifiers 302, 304, and 306. The addition portion 300 is divided into three stages. The first stage is configured by the adder 301 and the amplifier 302. The second stage is configured by the adder 303 and the amplifier 304. The third stage is configured by the adder 305 and the amplifier 306.

Equation (4) below is represented by adding the sensor output signal a=sin A to the third sensor output signal i3=sin (A+45°) in FIG. 19.

$$\sin A + \sin(A + 45°) = 2\sin\left(A + \frac{45°}{2}\right) \cdot \cos\left(-\frac{45°}{2}\right) \quad \text{[Formula 4]}$$

Equation (5) below can be represented due to Equation (4).

$$\sin\left(A + \frac{90°}{2^{M-3}}\right) = \frac{1}{2\cos\frac{90°}{2^{M-3}}}\left(\sin A + \sin\left(A + \frac{90°}{2^{M-4}}\right)\right) \quad \text{[Formula 5]}$$

As shown in FIG. 19, the multi-stage structure is provided. Thus, it is possible to sequentially produce a signal s3 corresponding to the output of the magnetic sensor that is spaced apart from the magnetic sensor $$2 \text{ by } \frac{90°}{2^{M-3}}.$$

Accordingly, in the case of further providing a comparison circuit and an absolute-value circuit after output terminals of the addition portion 300 by using signals such as s3, n3, and i3, the resolution of $2^M$ divisions (M is an arbitrary integer that is the same as or larger than four) can be obtained with only providing two magnetic sensors 2 and 3.

APPLICATION EXAMPLE

Figure 20:
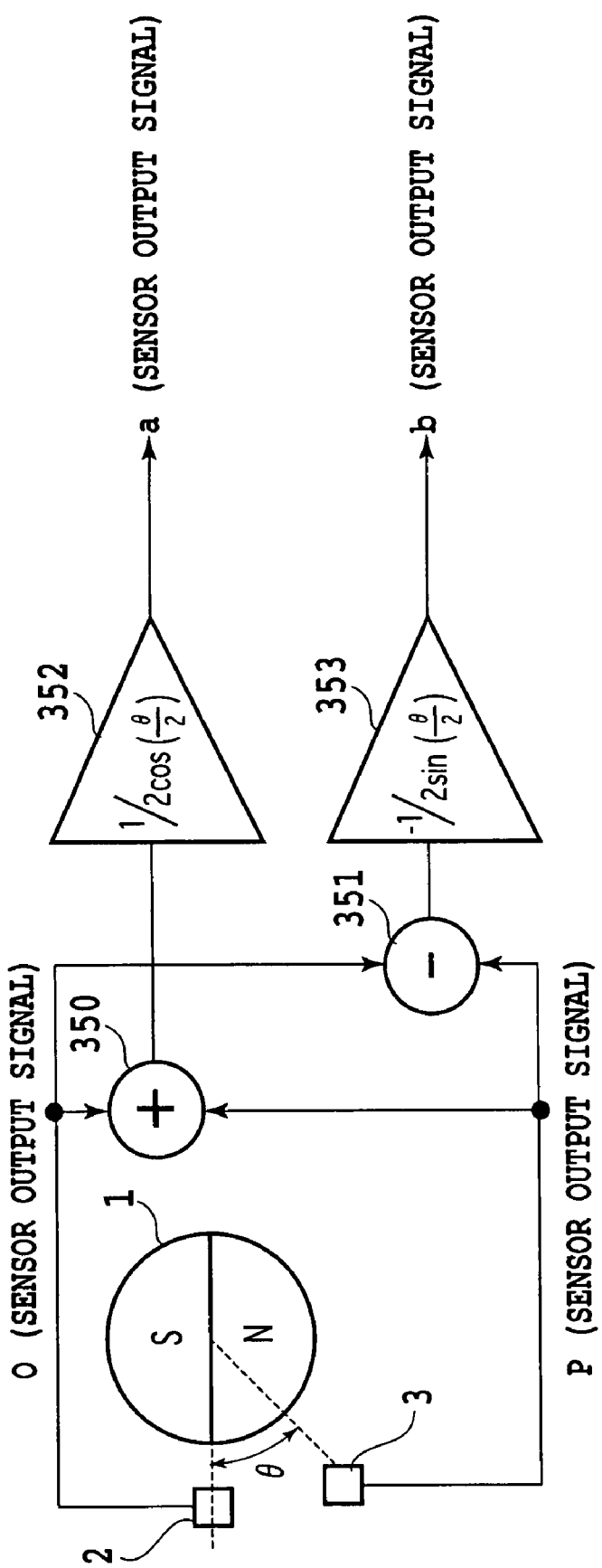
FIG. 20 is a circuit diagram showing an another example of a circuit for generating sensor output signals in the circuit of FIG. 16.
Figure 21:
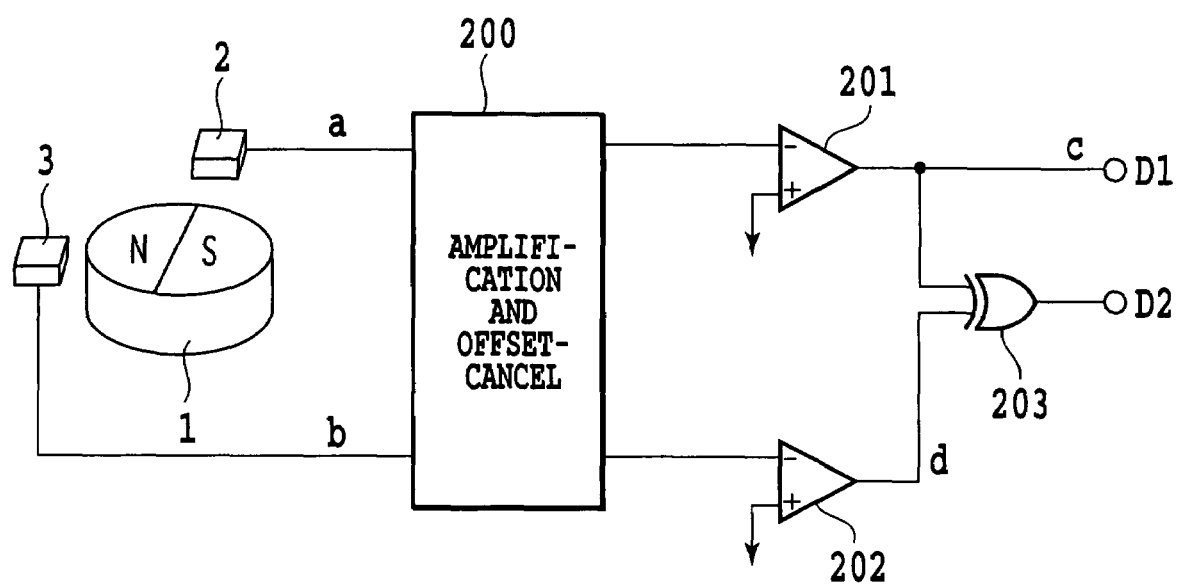
FIG. 21 is a schematic view showing a first conventional example of a non-contact rotation-angle sensor.

FIG. 20 shows an example of a circuit that generates the sensor output signals in the circuit of FIG. 16.

The circuit of this example is configured by an adder 350, a subtracter 351, and amplifiers 352 and 353. The sensor output signal a is generated through the adder 350 and the amplifier 352. The sensor output signal b is generated through the adder 351 and the amplifier 353.

In the example in FIG. 16, the magnetic sensors 2 and 3 are arranged such that the phase difference between the sensor output signals a and b is 90°. However, in the case where the magnetic sensors 2 and 3 are arranged such that the phase difference between the sensor output signals a and b is an arbitrary phase difference θ, it is assumed that an sensor output signal of the one magnetic sensor 2 is "o" and an sensor output signal of the other magnetic sensor 3 is "P". Then, "o" sensor output signal is proportion to sin A and "P" sensor output signal is proportion to sin(A+θ), when the magnet is rotated by 360°. When "o" sensor output signal and "P" sensor output signal are inputted to the adder 350 and the subtracter 351 respectively, the trigonometric function theorems in Equations (6) and (7) below are represented.

$$\sin A + \sin(A + \theta) = 2\sin\left(A + \frac{\theta}{2}\right) \cdot \cos\left(-\frac{\theta}{2}\right) \quad \text{[Formula 6]}$$

$$\sin A - \sin(A + \theta) = 2\cos\left(A + \frac{\theta}{2}\right) \cdot \sin\left(-\frac{\theta}{2}\right) \quad \text{[Formula 7]}$$

Equations (8) and (9) below can be obtained due to equations (6) and (7) of the theorems, $$\sin\left(A + \frac{\theta}{2}\right) = \frac{1}{2\cos\left(\frac{\theta}{2}\right)}(\sin A + \sin(A + \theta)) \quad \text{[Formula 8]}$$

$$\cos\left(A + \frac{\theta}{2}\right) = \frac{-1}{2\sin\left(\frac{\theta}{2}\right)}(\sin A - \sin(A + \theta)) \quad \text{[Formula 9]}$$

Accordingly, the right arithmetic terms of Equations (8) and (9) can be performed.

The sensor output signals obtained from equations (8) and (9) are the same in amplitude and are different phase difference θ by 90° each other. Therefore, in the case that the circuit of FIG. 20 is configured as generation circuits for the signals a and b having 90° phase difference shown in FIG. 16 and the rear-stage circuits connected to the circuit of FIG. 20 is configured as the same circuit of FIG. 16, the same advantageous results can be obtained.

The invention claimed is:

1. A magnetic rotation-angle sensor comprising:
a magnetic-pole generation means for generating one or more pairs of N-polarity and S-polarity magnetic poles;
a plurality of magnetic sensors, arranged around the magnetic-pole generation means, with a predetermined angle to a rotation center of the magnetic-pole generation means;
a plurality of polarity determination means for determining polarities of sensor output signals outputted from the magnetic sensors and outputting polarity determination signals indicating the determined polarities;
a plurality of absolute-value generation means for generating absolute values corresponding to the sensor output signals outputted from the magnetic sensors;
a plurality of comparison-result output means for comparing the generated absolute values and outputting absolute value comparison signals indicating results of the comparison;
an angle determination means for determining rotation angle of the magnetic-pole generation means, based on the polarity determination signals and the absolute value comparison signals, and outputting a predetermined determination result signal; and
an addition means for adding at least two sensor output signals outputted from the magnetic sensors and then generating a third sensor output signal,
wherein the third sensor output signal is inputted to at least one each of the plurality of polarity determination means and the plurality of absolute-value generation means to output polarity determination signals and absolute-value-comparison signals that correspond to the third sensor output signal, and the angle determination means determines the rotation angle of the magnetic-pole generation means based on the polarity determination signals and the absolute-value-comparison signals to output a predetermined determination result signal.

2. A magnetic rotation-angle sensor according to claim 1, wherein the plurality of magnetic sensors is configured as at least one pair of sensors, by arranging a pair of the magnetic sensors on a diagonal line that passes through the rotation center of the magnetic-pole generation means, wherein the magnetic sensors use the difference between the outputs from the sensors in the one pair as the sensor output signal, and perform the polarity determination and the absolute-value comparison based on the respective sensor output signals outputted from at least two pairs of sensors.

3. A magnetic rotation-angle sensor according to claim 1, wherein the respective sensor output signals outputted from the magnetic sensors is sinusoidal waves.

4. A magnetic rotation-angle sensor according to claim 2, the addition means have gain of $1/\sqrt{2}$.

5. A magnetic rotation-angle sensor according to claim 1, wherein the magnetic sensors are arranged such that, as the sensor output signals, a signal in proportion to sin A outputted from a first magnetic sensor and a signal in proportion to sin B outputted from a second magnetic sensor are produced when the magnetic-field generation means is rotated in the case that the number N of magnetic sensors is two,
wherein the magnetic sensors have the resolution of $2^M$ (M is an arbitrary integer that is the same as or larger than four) per pair of magnetic poles when the magnetic-field generation means is rotated by 360°.

6. An angle-information processing device comprising:
the magnetic rotation-angle sensor according to any one of claims 1-5;
a rotation portion with which the magnetic-field generation means of the magnetic rotation-angle sensor is provided; and
a signal processing portion, which is a circuit configuration portion excluding the magnetic-field generation means of the magnetic rotation-angle sensor, wherein the signal processing portion performs a predetermined digital-signal processing to sensor output signals outputted from the plurality of magnetic sensors arranged around the rotation portion with a predetermined angle and outputs a determination result signal.

7. The angle-information processing device according to claim 6, further comprising:
a signal conversion processing portion for converting the digitized processed determination result signal into an analogue signal.

* * * * *